US008080896B2

(12) United States Patent
Roskey

(10) Patent No.: US 8,080,896 B2
(45) Date of Patent: Dec. 20, 2011

(54) SYSTEM AND METHOD FOR CONVERTING WIND INTO MECHANICAL ENERGY

(75) Inventor: John Roskey, Carson City, NV (US)

(73) Assignee: JLM Energy Inc., Folsom, CA (US)

(*) Notice: Subject to any disclaimer, the term of this patent is extended or adjusted under 35 U.S.C. 154(b) by 658 days.

(21) Appl. No.: 12/251,943

(22) Filed: Oct. 15, 2008

(65) Prior Publication Data
US 2009/0102202 A1    Apr. 23, 2009

Related U.S. Application Data

(63) Continuation-in-part of application No. 11/709,320, filed on Feb. 20, 2007, now Pat. No. 7,663,262, which is a continuation-in-part of application No. 11/104,673, filed on Apr. 13, 2005, now Pat. No. 7,199,486, which is a continuation of application No. 10/619,732, filed on Jul. 14, 2003, now Pat. No. 6,911,744.

(51) Int. Cl.
F03B 9/00    (2006.01)

(52) U.S. Cl. ........................................................ 290/55

(58) Field of Classification Search .................... 290/55
See application file for complete search history.

(56) References Cited

U.S. PATENT DOCUMENTS

| | | |
|---|---|---|
| 3,436,908 A | 4/1969 | Van Delic |
| 3,883,750 A | 5/1975 | Uzzell, Jr. |
| 3,894,393 A | 7/1975 | Carlson |
| 3,913,470 A | 10/1975 | Cullen |
| 3,976,244 A | 8/1976 | Logsdon |
| 4,002,023 A | 1/1977 | Hartmann |
| 4,162,410 A | 7/1979 | Amick |
| 4,295,416 A | 10/1981 | Gorchev et al. |
| 4,315,415 A | 2/1982 | Wilson |
| 4,471,612 A | 9/1984 | Buels |
| 4,497,177 A | 2/1985 | Anderson |
| 4,504,192 A | 3/1985 | Byrus et al. |
| 4,508,973 A | 4/1985 | Payne |
| 4,546,264 A | 10/1985 | Pinson |
| 4,582,013 A | 4/1986 | Holland, Jr. |
| 4,642,958 A | 2/1987 | Pewitt |
| 4,781,523 A | 11/1988 | Aylor |
| 4,801,811 A | 1/1989 | Assaf et al. |
| 4,909,135 A | 3/1990 | Greko |
| 4,957,037 A | 9/1990 | Tubbesing et al. |
| 5,155,992 A | 10/1992 | Follensbee et al. |
| 5,195,251 A | 3/1993 | Gyurcsek et al. |
| 5,290,200 A | 3/1994 | Kiser |
| 5,326,314 A | 7/1994 | Brockway et al. |
| 5,380,149 A | 1/1995 | Valsamidis |
| 5,391,926 A | 2/1995 | Staley et al. |

(Continued)

FOREIGN PATENT DOCUMENTS
DE    4 002 341    8/1990
(Continued)

Primary Examiner — Joseph Waks
(74) Attorney, Agent, or Firm — Venable LLP; Jeffri A. Kaminski; Ryan M. Flandro

(57) ABSTRACT

A system for converting an airflow into mechanical or electrical energy, which includes a tubular member having a first opening and a second opening, a leading edge member positioned adjacent to one of the first and second openings, and a raised edge along each longitudinal edge of the leading edge member.

20 Claims, 22 Drawing Sheets

U.S. PATENT DOCUMENTS

| | | | |
|---|---|---|---|
| 5,394,016 A | | 2/1995 | Hickey |
| 5,395,598 A | | 3/1995 | Prueitt |
| 5,457,346 A | * | 10/1995 | Blumberg et al. ............... 290/55 |
| 5,483,798 A | | 1/1996 | Prueitt |
| 5,551,916 A | | 9/1996 | Morse, Jr. |
| 5,655,964 A | * | 8/1997 | Rheault et al. ................. 454/368 |
| 5,709,419 A | | 1/1998 | Roskey |
| 5,711,480 A | | 1/1998 | Zepke et al. |
| 5,746,653 A | | 5/1998 | Palmer et al. |
| 5,826,383 A | | 10/1998 | Garrison |
| 5,860,858 A | | 1/1999 | Wettergren |
| 5,982,046 A | | 11/1999 | Minh |
| 6,149,516 A | | 11/2000 | Mantyla |
| 6,239,506 B1 | | 5/2001 | Roskey |
| 6,319,115 B1 | | 11/2001 | Shingaki |
| 6,437,457 B2 | | 8/2002 | Roskey |
| 6,510,687 B1 | | 1/2003 | Zaslavsky et al. |
| 6,655,907 B2 | | 12/2003 | Brock et al. |
| 6,765,309 B2 | | 7/2004 | Tallal et al. |
| 6,911,744 B2 | | 6/2005 | Roskey |
| 7,026,723 B2 | | 4/2006 | Moreno |
| 7,199,486 B2 | | 4/2007 | Roskey |
| 7,256,512 B1 | | 8/2007 | Marquiss |
| 7,663,262 B2 | * | 2/2010 | Roskey ......................... 290/55 |
| 2007/0236021 A1 | | 10/2007 | Roskey |
| 2009/0160197 A1 | * | 6/2009 | Roskey et al. ................. 290/55 |

FOREIGN PATENT DOCUMENTS

| | | |
|---|---|---|
| FR | 450 138 | 3/1913 |
| FR | 1 195 450 | 11/1959 |
| FR | 2 379 709 | 10/1978 |

* cited by examiner

SYSTEM AND METHOD FOR CONVERTING WIND INTO MECHANICAL ENERGY

CROSS REFERENCE TO RELATED APPLICATIONS

This application is a Continuation-in-part of U.S. patent application Ser. No. 11/709,320, filed Feb. 20, 2007, now U.S. Pat. No. 7,663,262, which is a Continuation-in-part of U.S. patent application Ser. No. 11/104,673, filed Apr. 13, 2005, now U.S. Pat. No. 7,199,486, which is a Continuation of U.S. patent application Ser. No. 10/619,732, filed on Jul. 14, 2003, now U.S. Pat. No. 6,911,744, and which are incorporated by reference herein in their entirety.

FIELD OF THE INVENTION

The invention relates to a system and method for converting an airflow into mechanical energy for a building and the like, and more particularly, the invention relates to a system and method for collecting wind energy and converting the wind energy into useful energy forms.

BACKGROUND OF THE INVENTION

Many wind energy collection systems have been proposed in the prior art. Classic windmills and wind turbines employ vanes or propeller surfaces to engage a wind stream and convert the energy in the wind stream into rotation of a horizontal windmill shaft. These classic windmills with exposed rotating blades pose many technical, safety, environmental, noise, and aesthetic problems. The technical problems may include mechanical stress, susceptibility to wind gusts and shadow shock, active propeller blade pitch control and steering, and frequent dynamic instabilities which may lead to material fatigue and catastrophic failure. In addition, the exposed propeller blades may raise safety concerns and generate significant noise. Furthermore, horizontal axis wind turbines cannot take advantage of high energy, high velocity winds because the turbines can be overloaded causing damage or failure. In fact, it is typical to govern conventional horizontal windmills at wind speeds in excess of 30 mph to avoid these problems. Since wind energy increases as the cube of velocity, this represents a significant disadvantage in that high wind velocities, which offer high levels of energy, also require that the windmills be governed.

Vertical axis turbines are also well known. Although vertical axis turbines address many of the shortcomings of horizontal shaft windmills, they have their own inherent problems. The continual rotation of the blades into and away from the wind causes a cyclical mechanical stress that soon induces material fatigue and failure. Also, vertical axis wind turbines are often difficult to start and have been shown to be lower in overall efficiency.

One alternative to the horizontal and vertical axis wind turbines described above is the airfoil wind energy collection system described in U.S. Pat. Nos. 5,709,419 and 6,239,506. These wind energy collection systems include an airfoil or an array of airfoils with at least one venturi slot penetrating the surface of the airfoil at about the greatest cross-sectional width of the airfoil. As air moves over the airfoil from the leading edge to the trailing edge, a region of low pressure or reduced pressure is created adjacent to the venturi slot. This low pressure region, caused by the Bernoulli principal, draws air from a supply duct within the airfoil, out of the venturi slot and into the airflow around the airfoil. The air supply ducts within the airfoil are connected to a turbine causing the system to draw air through the turbine and out of the airfoil slots thus generating power.

In the wind energy collection systems described in U.S. Pat. Nos. 5,709,419 and 6,239,506, the slot, or the area just aft of the leading edge and prior to the tubular section, was a low pressure area used for drawing air out of the airfoil. However, it has been found that the draw was developed by only a small portion of the slot, that coinciding with the very beginning of longitudinal opening on the tubular member. Therefore, the goal seemed to be a wider opening. However, as the opening was enlarged, the performance dropped off after the size of the opening reached a width equal to or greater than the width of the leading edge. Accordingly, this established a limit on the size of the opening.

Unlike previous wind generation technologies, drawtubes markedly increase a neighbor's performance when placed in carefully designed Arrays. It can also be appreciated that drawtubes and arrays represent a wind energy technology that is well suited for architecturally compatible implementations and, by implication, for suburban to urban installations. In contrast, other building-integrated designs often appear as clumsy arrangements utilizing oversized props and contrived ducts.

Yet the suburban/urban market is not only the fastest growing demand for electrical energy, it is also the least likely to support a generational facility. This automatically puts the utilities into the position of further destabilizing the grid by continuing to construct remote and/or regionally centralized plants. Even the utilities recognize that this is a problem. Not only does distributed generation naturally provide greater efficiencies and reliabilities, it also increases our national security. Accordingly, it would be desirable to provide building-integrated wind energy collection systems, which implement a drawtube wind energy collection and concentration system.

SUMMARY OF THE INVENTION

In accordance with one aspect of the invention, a system for converting an airflow into mechanical or electrical energy is provided. The system may comprises a tubular member. The tubular member may have a first opening and a second opening. A leading edge member may be positioned adjacent to one of the first and second openings. The leading edge member may include a raised edge along each longitudinal edge of the leading edge member.

In accordance with another aspect of the invention, a method for collecting wind energy may be provided. The method may comprise providing a drawtube. The drawtube may include a tubular member having a pair of openings. The drawtube may include a leading edge member positioned adjacent to one of the openings. A raised edge may be included along each longitudinal edge of the leading edge member. The method may include positioning the drawtube in the wind with the leading edge member facing into the wind and passing wind around the leading edge member to create eddies in and around the tubular member and the leading edge member.

The present invention provides the advantages of improved efficiency and improved structural strength in a system for converting an airflow into mechanical energy with substantially stationary wind contacting surfaces.

BRIEF DESCRIPTION OF THE DRAWINGS

The invention will now be described in greater detail with reference to the preferred embodiments illustrated in the accompanying drawings, in which like elements bear the reference numerals, and wherein.

DETAILED DESCRIPTION

This invention provides a system for converting an airflow into mechanical energy with non-moving wind contacting parts and which provides improved efficiency with a stronger, simpler construction.

Figure 1:
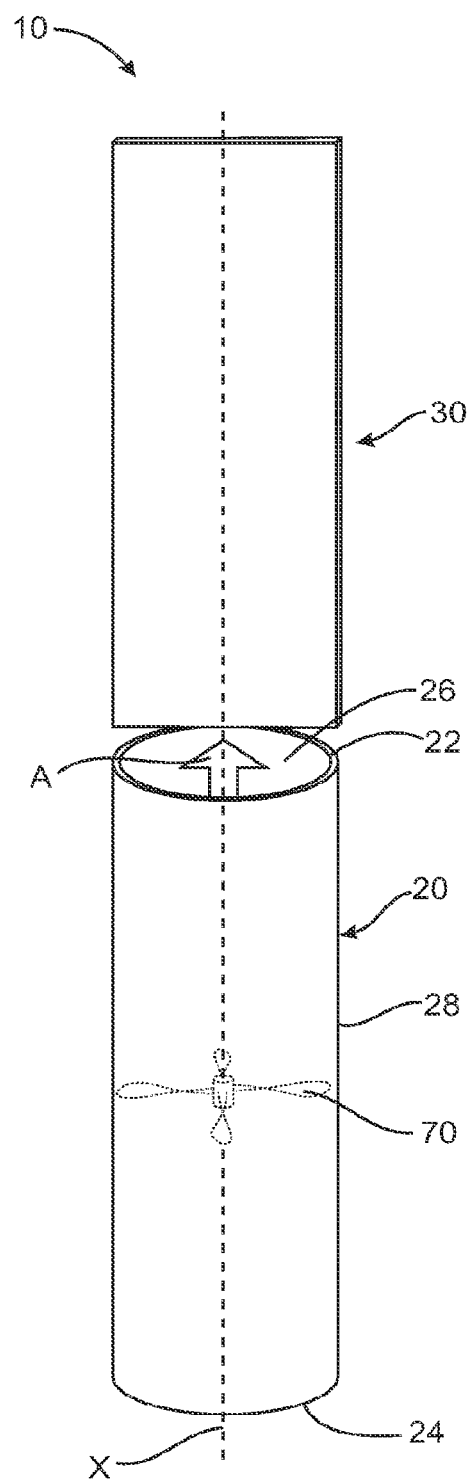
FIG. 1 is a perspective view of a system for converting an airflow into mechanical energy in the form of a simple drawtube.

FIG. 1 shows a drawtube 10 for converting an airflow into mechanical energy having a tubular member 20, a substantially planar leading edge member 30, and an energy conversion device 70. The wind in FIG. 1 is assumed to be coming out of the page. The energy conversion device 70 may be positioned within the tubular member 20 as shown in FIG. 1 or connected to the drawtube 10 by an air plenum. The tubular member 20 has a first opening 22 and a second opening 24 formed in two planes substantially perpendicular to a longitudinal axis X of the tubular member. The substantially planar leading edge member 30 is positioned in front of or on the windward side of the first opening 22. The leading edge member 30 in the embodiment of FIG. 1 is in a plane, which is substantially parallel to the longitudinal axis of the tubular member 20; however, the leading edge may also be canted aft as will be described further below. The tubular member 20 has a circular cross-section; however, it can be appreciated that the tubular section can be oval, rectangular, or otherwise shaped without departing from the present invention. The substantially planar leading edge member 30 (or leading edge) causes a deep low static pressure region to be formed adjacent to the first opening 22 of the tubular member 20. This low pressure region causes air to be drawn through the tubular member 20 in the direction of the arrow A.

In order to increase the opening size of the wind energy collection systems as described in U.S. Pat. Nos. 5,709,419 and 6,239,506 without also incurring the width-related performance penalty, the opening 22 was placed at substantially 90 degrees to the leading edge 30. This led to the minimal design of the simple drawtube 10 of FIG. 1 consisting of the tubular member 20 with a circular end opening 22 and a substantially planar member 30 (or leading edge) installed next to one opening 22. The bottom opening 24 of the tubular member 20 can be connected to an air plenum (not shown), wherein the air plenum connects the drawtube 10 to others, and/or to a mechanical-to-electrical energy conversion device.

In operation, the system 10 of FIG. 1 functions based on the generally known principle that within a system, the total pressure in the air is equal to a constant. In addition, the total pressure is also equal to the sum of the dynamic, static, and potential pressure components. In this case, the potential pressure component remains constant. Accordingly, if the dynamic component, or the air velocity varies, the static component, or the absolute or gauge pressure, must vary by an equal and opposite amount, i.e.

$$P_{TOTAL} = P_{DYNAMIC} + P_{STATIC} = C$$

where
$P_{TOTAL}$ is the total pressure,
$P_{DYNAMIC}$ is the dynamic pressure, and
$P_{STATIC}$ is the static pressure.

In the case of the present invention, the substantially planar leading edge member 30 (or leading edge) accelerates the airflow (i.e., wind) at a point adjacent to an edge of the substantially planar leading edge member 30. Velocities in this region can be many times greater than the ambient winds. Accordingly, since the total pressure must remain constant, the very high velocities also mean very low static pressures adjacent an edge of the leading edge 30.

One of the particular advantages of the design of the present invention is that in using a closed system, the user can benefit from both the static and dynamic components of the airflow. An open-air turbine of conventional design, for example, can only harvest the dynamic pressure component as the static pressure differentials dissipate into the open air. This is further compounded by the fact that the local air velocity is slowed substantially, by no less than about one-third, before it ever reaches an open-air or conventional wind turbine. The effect of slowing the approaching wind reduces the amount of energy that a wind turbine can capture to an absolute maximum described by the Betz limit. Generally, it is acknowledged that all flat-plate bodies in the wind slow the oncoming air velocity to about two-thirds (⅔) of the original velocity. Although the present invention is also restricted by the Betz limit, a drawtube does increase the energy density through the energy conversion device by collecting energy across its overall flat-plate area. It can be appreciated that an increase in energy is seen not only from just the flat-plate area(s), but also the tube, wherein the whole drawtube is seen as a single body by the wind.

Using traditional designs for wind turbines, the only way to increase the amount of energy presented to the turbine at a given wind speed is to increase the area, or the diameter of the propeller. To reach a fivefold increase in energy, for example, one would have to increase the propeller diameter by 2.236 times, since the area of the propeller increases with the radius squared. In the real world of mechanical stress and strain, not to mention clearance issues, gyroscopic forces, teetering, and all the other issues of large, open air props, such increases can be impractical.

In addition to differential pressures, strong leading edge vortices formed adjacent to the edges of the substantially planar leading edge member 30 also play a part in increasing the ability of the system to generate energy. The leading edge vortices are tubular in nature, and rotate in opposite directions, i.e., backwards with the wind and inwards toward the area behind the center of the substantially planar leading edge member 30. This strong rotational flow also helps to trap, entrain and draw along the airflow from within the outlet opening 22 of the tubular member 20. When the system 10 is canted with the leading edge member 30 at about 33 degrees aft, these vortex tubes stay substantially fixed in position, thus increasing the performance. In a preferred embodiment the tubular member 20, and the leading edge 30, are both canted at about 33 degrees. However, each of these members can be canted individually to achieve some of the benefits. The substantially planar leading edge member 30, being slightly less in width than the diameter of the tubular member 20, places the high velocity vortex tubes in optimal position with respect to the circular tubular member 20 outlet opening 22.

An aspect ratio, or height to width ratio of the entire drawtube, of about 6 to 1 is desirable because it allows a high velocity flow over a "bluff body" airfoil, which in turn creates high velocity vortices off the substantially planar leading edge member 30. In addition, when the tubular member 20 is tubular, or cylindrical, it affords the lowest friction solution to moving air within an enclosed, or interior, volume. It also presents a "bluff body" cross-section to the wind, which encourages strong vortex formation.

As shown in FIG. 1, the wind energy system 10 includes the tubular member 20, the substantially planar leading edge member 30, and the energy conversion device 70 for converting the airflow into rotational mechanical energy. The second opening 24 of the tubular member 20 is configured to form an air plenum. For the purposes of this application, the air plenum can be of any length and/or configuration and is thought of simply as an enclosed air passageway connecting the low static pressure regions of the system 10 to a higher static pressure region, which may be either the outside air or an increased static pressure region formed by the action of one or more scoops (shown in FIG. 2). The air plenum in the example of FIG. 1 begins with the low pressure region adjacent to the substantially planar leading edge member 30 and extends through the tubular member 20 of the drawtube 10 to the second opening 24.

The energy conversion device 70 is placed in the air plenum and converts the mechanical energy of a rotating turbine to electrical energy or other energy. Although the energy conversion device 70 has been shown within the tubular member 20, it may also be placed at a remote location as illustrated in U.S. Pat. Nos. 5,709,419 and 6,239,506, which are incorporated herein by reference in their entirety.

In operation, the substantially planar leading edge member 30 is positioned on the windward side of the tubular member 20 or in front of the tubular member. When an airflow, for example, a gust of wind blows past the substantially planar leading edge member 30, the area adjacent the first opening 22 of the tubular member 20 is at a low pressure compared with the air pressure outside of the second opening 24 of the tubular member 20. This pressure difference causes air from within the tubular member 20 to flow out of the tubular member 20 through the first opening 22.

According to one example, the substantially planar leading edge member 30 is a plate-shaped member having a height which is about equal to a height of the tubular member 20, and a width which is about equal to or slightly less than the width of the opening 22. The substantially planar leading edge member 30 is as thin as is structurally possible. For example, the planar leading edge may have a thickness of between about 1/2400 to about 1/16 of the height of the substantially planar leading edge member 30.

Figure 2:
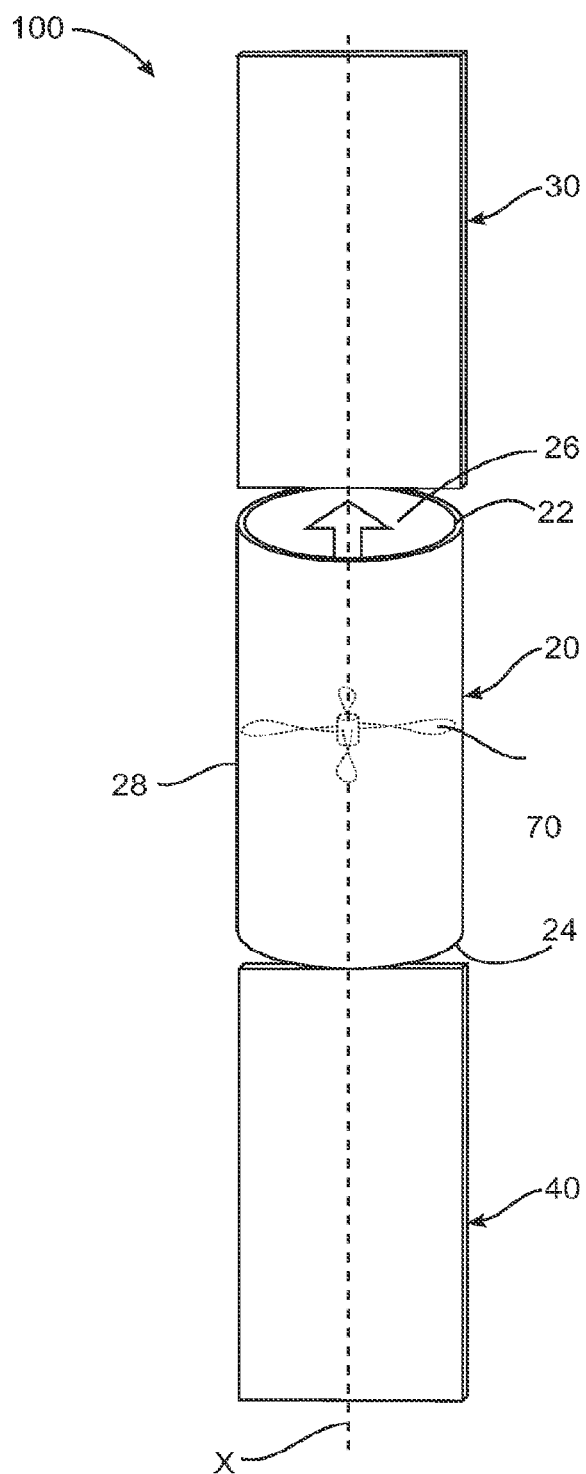
FIG. 2 is a perspective view of an alternative embodiment of the system for converting an airflow into mechanical energy in the form of a compound bidirectional drawtube.

In another embodiment as shown in FIG. 2, a compound drawtube 100 includes the tubular member 20, the substantially planar leading edge member 30, the energy conversion device 70, and a scoop member 40. The wind in this embodiment is assumed to be coming out of the page. However, the drawtube 100 also operates with wind going into the page.

In order to maximize performance, or the flow of air within the tubular member 20 and/or plenum, an opposing, high pressure region can be created. It has been shown that an increased positive pressure gradient is created by a scoop member 40, shown in FIG. 2. The placement of the scoop 40, if used, is at opposite ends of the tubular member 20, with the energy conversion device placed within the tubular member and between the low pressure region of the drawtube adjacent the leading edge 30 and the high-pressured region adjacent the scoop 40.

The scoop member 40 (or scoop) causes an increase in static pressure by converting the dynamic component of the wind energy (dynamic pressure) in close proximity to the second opening 24 of the tubular member 20 to static pressure. The increase in the local static pressure at the second opening 24 and the low static pressure at the first opening 22 creates high velocity airflow through the interior of the tubular member 20 and through the turbine of the energy conversion device 70.

The present invention operates through the acceleration and deceleration of the wind, or airflow, based on the Bernoulli theory. It creates two dissimilar regions, one of high velocity, low static pressure and one of low velocity, high static pressure, and then connects the two in a controlled environment. The vortices carry high velocity air backwards and inwards to interact with the wide circular outlet opening 22 on the tubular member 20. The lowest velocity air is created at the center of a blunt surface, such as the interface between the scoop member 40 and the tubular member 20 inlet opening 24. This interface is located at the lateral centerline of the scoop member 40 to take advantage of the lowest velocity air.

The compound drawtube 100, as shown in FIG. 2, is a bidirectional system wherein both the substantially planar leading edge member 30 and the scoop member 40 can function as either the leading edge or the scoop depending on the direction of the approaching wind. As shown in FIG. 2, if the wind or airflow were coming from the direction of the observer, the scoop member 40 would assume the role of the leading edge. Meanwhile, the substantially planar leading edge member 30 would assume the role of the scoop. Conversely, if the wind or airflow were coming from the opposite direction, the substantially planar leading edge member 30 would become the leading edge, and the scoop member 40 would be the scoop. In most bidirectional systems, the substantially planar leading edge member 30 and scoop member 40 have a substantially similar design.

The leading edge is generally defined as a substantially planar member positioned on the windward side or in front of the tubular member 20. The leading edge member 30 is positioned adjacent to the outside of the first open end 22 of the tubular member 20. Meanwhile, the scoop is generally defined as a substantially planar member positioned on the leeward side or in back of the tubular member 20. The scoop 40 is positioned adjacent to the outside of the second open end 24 of the tubular member 20. The tubular member 20 is configured to create a pressure differential within the tubular member when wind blows past the compound drawtube 100 generating an airflow within the tubular member. As discussed above with respect to FIG. 1, the energy conversion device may alternately be located outside of the drawtube 100 and connected by air passages.

Figure 3:
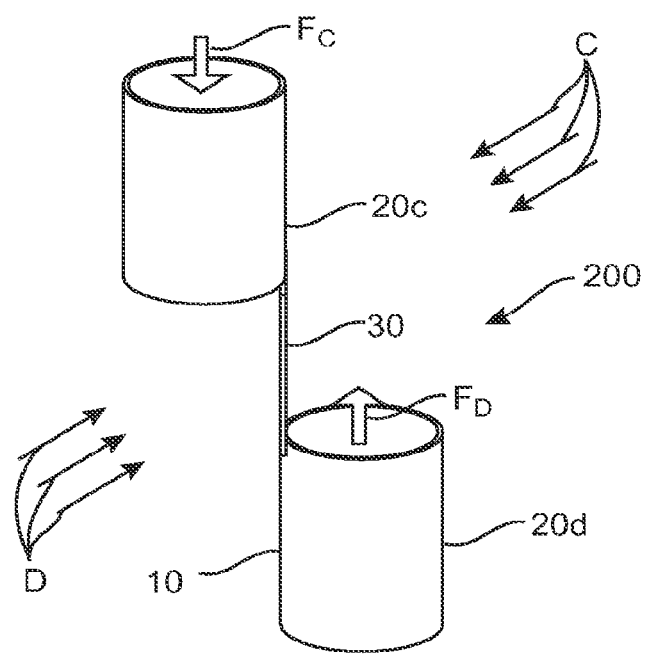
FIG. 3 is a perspective view of another configuration of a compound bidirectional drawtube according to an alternative embodiment.

FIG. 3 illustrates an alternative embodiment of a compound bidirectional drawtube 200 having two tubular members 20 and one rectangular leading edge member 30 which operates with one of the tubular members depending on the direction of the wind. The leading edge 30 also acts as a scoop with the other tubular member thus increasing the pressure differential and, ultimately, the airflow within the tubular members 20c and 20d. In the embodiment of FIG. 3, when the wind is blowing in the direction of the arrows C, the planar leading edge 30 operates in combination with the tubular member 20c to create an airflow in the direction $F_C$ through the tubular member 20c. The leading edge 30 also operates as a scoop for the tubular member 20d when the airflow is in the direction C. When the airflow is in the direction of the arrows D, the leading edge 30 operates as a leading edge in combination with the tubular member 20d to create an airflow in the direction FD through the tubular member 20d and operates as a scoop for tubular member 20c. One difference between the drawtube 100 of FIG. 2 and the drawtube 200 of FIG. 3, is that the compound drawtube of FIG. 2 is better suited for an internal energy conversion device or embedded drawtube, whereas the compound drawtube of FIG. 3 is better suited (but not limited to) for a plenum mounted energy conversion device, such as you might see in an array.

Figure 4:
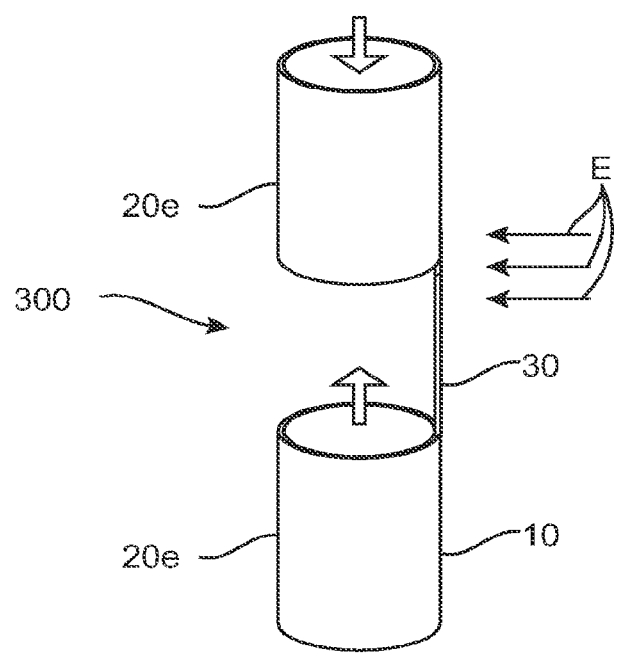
FIG. 4 is a perspective view of one configuration of a unidirectional compound drawtube according to another embodiment.

FIG. 4 illustrates an alternative compound drawtube configuration with two tubular members 20e interconnected by a planar leading edge 30. When the wind blows from the wind direction E the planar leading edge 30 operates as a leading edge for both of the tubular members 20e and the airflow through the tubular members 20e is as shown. If the wind is in the opposite direction, the planar leading edge 30 becomes a scoop and the airflow direction is reversed. As in the single direction drawtube 10 of FIG. 1, the single direction drawtube 300 of FIG. 4 may be mounted on a rotation mechanism for allowing the drawtube to rotate so that the planar leading edge 30 faces into the wind. The rotatable support structure for rotating the drawtubes may be any of those, which are known to those in the art.

The Tubular Member

Figure 8A:
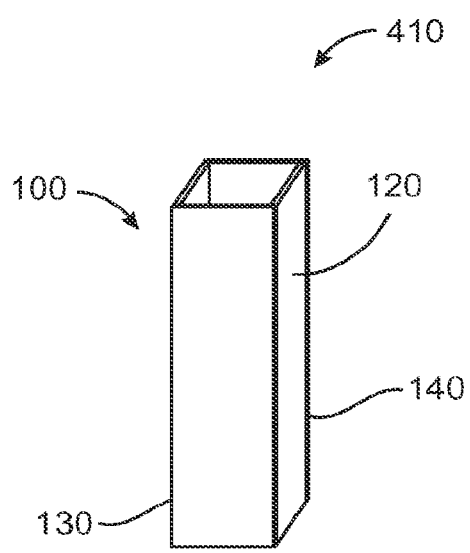
FIGS. 8A and 8B are perspective views of an alternative embodiment of a compound drawtube with sliding plates.
Figure 8B:
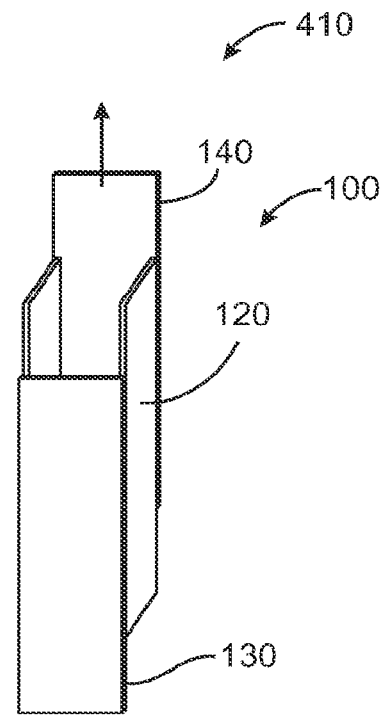

As shown in FIGS. 1 and 2, the tubular member 20 has a circular cross-section. However, the tubular member 20 can be slightly oval, or composed of planar sections with connecting angles in an approximation of a circular cross-section (as shown in FIGS. 8A and 8B). The performance should increase as the drawtube approximates a cylinder. In addition, it can be appreciated that other shapes and configurations of the tubular members can be used.

As shown in FIGS. 1 and 2, the tubular member 20 has an interior surface 26 and an exterior surface 28. In one embodiment, the interior surface 26 of the tubular member 20 is smooth and as free as possible from obstructions of any sort. If any obstructions are required, they are preferably oriented longitudinally, not laterally, or cross-flow. The exterior surface 28 of the tubular member 20 is also smooth. If exterior obstructions are required, the obstructions are preferably lateral rather than longitudinal.

The Drawtubes

The size and shape of the drawtubes 10, 100, 200, 300 as shown in FIGS. 1-4, are based on the availability of aerodynamic propellers, generators, local ordinances and covenants (including height restrictions), and ease of installation and maintenance. However, it can be appreciated that the drawtubes 10, 100, 200, 300 can be constructed to almost any dimension. In other words, the aerodynamic performance remains predictable as the size of the drawtubes 10, 100, 200, 300 increase until the point where the wind speed off the substantially planar leading edge member 30 approaches the speed of sound. In addition, as the size of the drawtubes 10, 100, 200, 300 decreases, the performance characteristics remain the same as long as turbulent flow is possible.

In one embodiment, the simple drawtube 10 of FIG. 1 has a height to width ratio of about six-to-one (i.e., the total height of the drawtube 10, including the tubular member 20 and the substantially planer leading edge member 30). When three components, two tubular members and one substantially planar member (FIG. 3), or one tubular member and two substantially planar members (FIG. 2), are combined, the system forms a compound drawtube. In each case, simple or compound, the resulting aerodynamic system can have an aspect ratio of about 6:1. Additionally, each component should approximate the aspect ratio of each other component in the system. For instance, in a simple drawtube, the two components can each have an aspect ratio of about 3:1. In the compound drawtube however, each component would have an aspect ratio of about 2:1.

Although drawtube aspect ratios of about 6:1 have been described, it can be appreciated that other ratios can be used. For example, height to width ratios of about 2:1 to about 100:1 can be used. Preferably a height to width ratio of about 4.5:1 to about 10:1 is used. The length of each section (i.e., the tubular member 20, the substantially planar leading edge member 30 and the scoop member 40) is about equal in length.

The Leading Edge and Scoop

The substantially planar leading edge member 30 and the scoop member 40 are generally rectangular shaped planar members. However, it can be appreciated that other shapes can be used including square, oval, or other shapes that provide a leading edge vortex. In addition, the substantially planar leading edge member 30 and the second planar member 40 are as thin as possible, unobstructed, and straight. In one embodiment, the substantially planar leading edge member 30 is substantially flat. However, it can be appreciated that the substantially planar leading edge member 30 can have a curved or angled surface for increased structural strength and for rotating the system to face the wind. The lateral width of the substantially planar leading edge member 30 and the scoop member 40 can be slightly less than the diameter of the tubular member. In one embodiment, the lateral width of the substantially planar leading edge member 30 and the scoop member 40 are about ¹³⁄₁₆ of the diameter of the main body of the tubular member 20.

The longitudinal length of the substantially planar leading edge member 30 and the scoop member 40 should be tied to the aspect ratio (i.e., longitudinal length to lateral width) of the overall drawtube 10, 100, 200, and 300. Each part of the drawtube 100, including the substantially planar leading edge member 30, the scoop member 40, and the tubular member 20, can be about one-third of the overall length of the drawtube 100. Accordingly, if the drawtube 100 has a ratio of six-to-one, the longitudinal length of each part of the drawtube 100 would be about one-third of the total length of the drawtube 100, or two times the diameter of the tubular member 20. The substantially planar leading edge member 30 can be almost any size and can be formed in a variety of different shapes.

Figure 5:
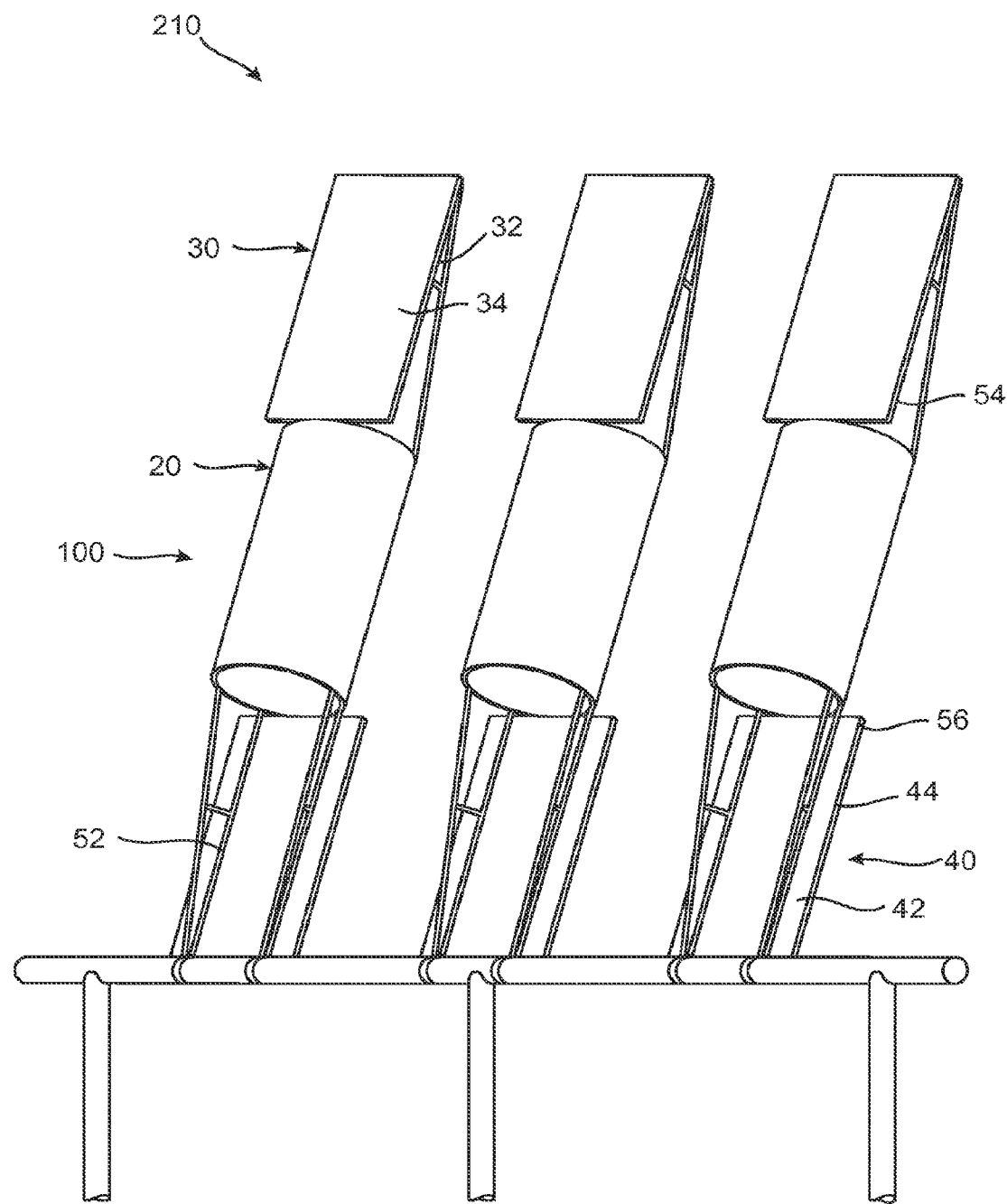
FIG. 5 is a perspective view of a panel of three compound bidirectional drawtubes according to the present invention.

As shown in FIG. 5, the substantially planar leading edge member 30 and the scoop member 40 have an interior surface 32, 42 and an exterior surface 34, 44, respectively. The exterior surfaces 34, 44 face away from the tubular member 20. Meanwhile, the interior surfaces 32, 42 face toward the tubular member 20.

In one embodiment, the exterior surface 34 of the substantially planar leading edge member 30 (leading edge) does not have longitudinal obstructions. However, if longitudinal obstructions are used such as for support members, they preferably are not placed near an edge of the substantially planar leading edge member 30. In addition, the interior surface 32 of the substantially planar leading edge member 30 preferably does not have longitudinal obstructions near the edges either. The interior surface 32 of the substantially planar leading edge member 30 is flat; however, it can be curved or shaped otherwise.

The scoop member (scoop) 40 is either curved or flat. For bi-directional drawtubes 100, 200 as shown in FIGS. 2 and 3, without design restrictions other than performance, both the scoop member 40 and the substantially planar leading edge member 30 are substantially flat, since both will alternate roles as the leading edge and scoop. In addition, the interior surface 42 of the scoop member 40, (i.e., the side facing the drawtube 100) is preferably free of obstructions. If obstructions are used, such as for support members, on the side facing the drawtube 100, they can be arranged longitudinally if possible and kept away from the edges. As shown in FIG. 5, a smooth exterior surface can be achieved by placing longitudinal supports 52 on the interior surfaces 32, 42 of the substantially planar leading edge 30 and the scoop member 40.

The substantially planar leading edge member 30 is substantially rectangular in shape. In addition, the scoop member 40 is substantially rectangular for the bidirectional drawtubes of FIGS. 2 and 3, and has the same shape as the substantially planar leading edge member 30. However, it can be appreciated that other shapes can be used.

In one embodiment of the present invention, the substantially planar leading edge member 30 and the scoop member 40 are attached directly to the first and second openings of the tubular member 20. The substantially planar leading edge 30 and the scoop member 40 have a longitudinal and lateral width wherein the longitudinal length is greater than the lateral width creating a long edge and a short edge. The tubular member 20 is connected to a middle portion of the short edge of the substantially planar leading edge member 30 and the scoop member 40. The windward side of the transition between the substantially planar leading edge member 30 and the scoop member 40 to the tubular member 20 is smooth without air gaps. In addition, an outside lateral edge 54, 56 of the substantially planar leading edge member 30 and the scoop member 40, respectively, are not fared into the tubular member 20. Rather, the outside lateral edges 54, 56 are free to contact the wind.

The drawtubes 10, 100, 200 are preferably placed on an inclination from about 0 degrees aft to about 60 degrees aft, and more preferably about 33 degrees aft (away from the wind). In other words, the plane of the leading edge 30, the axis of the tubular member 20, and the plane of the scoop 40 are all angled at an angle of about 33 degrees to the vertical with the free end of the leading edge positioned aft and the free end of the scoop forward.

In operation, the "performance to angle of inclination" curve climbs smoothly from about one, or the reference point for a drawtube 10, 100, 200 with the drawtube parallel to, and facing into the wind, to perpendicular, to a peak at about 33 degrees aft (at twice the performance of perpendicular), and then drops back down crossing the same level as perpendicular at about 45 degrees aft and then continues downward back toward reference when the drawtube 10, 100, 300 is, once again, parallel to the wind.

Energy Conversion Devices

The energy conversion device 70 is used to convert the airflow (i.e., wind) into mechanical energy (rotational, pneumatic, etc.) and/or electrical energy. In one embodiment, the energy conversion device 70 is an airflow turbine positioned within the tubular member 20. However, it can be appreciated that the energy conversion device 70 can be any type of conversion device known to one skilled in the art that can be used to convert the airflow into mechanical energy. For example, the energy conversion device 70 can be a rotational mechanical to electrical energy converter, a device which utilizes the pneumatic pressure differentials between the high and low static pressure regions, such as a jet pump or venturi nozzle, or a device which transfers the mechanical energy of a rotating propeller to a mechanical device outside the drawtube.

The energy conversion device may be located remotely and connected to the drawtube 10, 100, 200, 300 by a system of air passageways or air plenums. The remotely located energy conversion device may be a turbine, jet pump, or the like connected to one or more drawtubes by air passages. The energy conversion device may convert wind to mechanical energy, electrical energy, or a combination thereof. The mechanical energy created may include rotation of a propeller or turbine blade, a high velocity airflow, or other mechanical energy. The mechanical energy may be used directly or used to generate electrical energy.

In an alternative embodiment, the system uses an aerodynamic propeller to collect and convert the airflow into rotational mechanical energy. The mechanical energy is then converted through an electrical generator into electrical energy.

The energy conversion device 70 or aerodynamic propeller/generator is placed at the center of the tubular member 20, or within the air plenum and between the drawtube induced low-pressure region and the scoop member 40. However, it can be appreciated that other locations can be chosen without departing from the present invention.

For a bidirectional drawtube 100, 200 as shown in FIGS. 2 and 3, the energy conversion device 70 will produce power with airflow in either direction. For example, an aerodynamic propeller with a low camber and a generator capable of producing power in either rotational direction can be chosen. In another embodiment, a permanent magnet generator/alternator passing through a bridge rectifier can be employed.

As shown in FIG. 2, the air plenum containing the energy conversion device 70 is generally confined to the tubular member 20 of the drawtube 100. For FIG. 3, the energy conversion device 70 is generally located outside of the drawtube 200 in an air passageway connected to the drawtube. Generally, the drawtubes 100 will have a wider angle of efficacy when placed vertically. Although the invention has been illustrated with the drawtubes 100 positioned vertically, the drawtubes can be positioned horizontally or at any other angle.

Arrays of Drawtubes

An array can be any plurality of the drawtubes 10, 100, 200, 300 described above or any combination thereof. The arrays described herein are merely some of the possible array arrangements.

Figure 6:
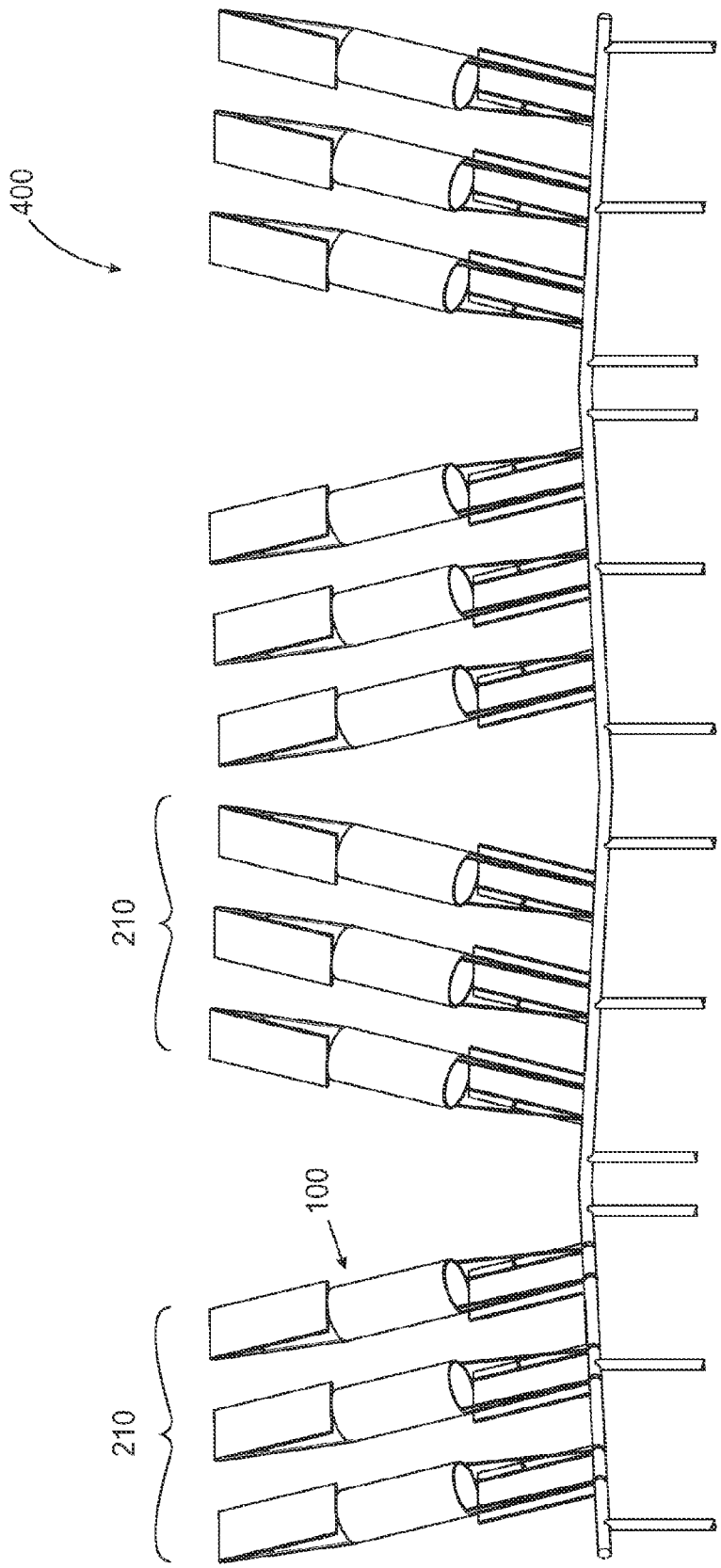
FIG. 6 is a perspective view of an array of the system for converting an airflow into mechanical energy according to the invention.

FIG. 6 shows a plurality of drawtubes 100 for collecting energy such as those shown in FIG. 2 configured in a fixed, fence-like, or lateral array 210. The fence-like array 400 is preferably constructed perpendicular to the predominant winds.

Although the possible variations of arrays are endless, the increased performance of the drawtubes 10, 100, 200, 300 by a variation of arrays is unique to this design. As shown in FIG. 6, the fence-like array 400 is constructed in a fence-like fashion, composed of connecting sections, or panels 210. Each panel 210 of three drawtubes 100, four of which are shown in FIG. 6, support a plurality of drawtubes 100. In FIG. 6, the panels 210 shown are angled at about 30 degrees with respect to the adjacent panels. In this embodiment, the "fence-like" array 400 zigzags across the ground for increased stability. In operation, each panel 210 of three drawtubes 100 produces about 500 watts, yielding a total of about 2 kW for an array of four panels 210. In addition, each array 400 is designed to be modular, such that a customer can simply add as many panels 210 as required to meet the desired level of output power.

The panels 210 have a space between drawtubes 100 of about one to three times the diameter of the drawtubes 100. This increases the output of each drawtube. The optimal spacing between drawtubes is about 1.25 diameters. This fence array is just an example of the many possible types of arrays. The array 400 creates an air passageway that accelerates the airflow between the drawtubes 100, thus increasing the performance and output of each individual drawtube 100, and hence the array 400.

Generally, the substantially planar leading edge member 30 and scoop member 40 are placed perpendicular to the wind. In other words, the flat surfaces of the substantially planar leading edge member 30 and scoop member 40 face into the wind. However, when winds are as much as 45 degrees to either side of perpendicular, an array 400 of drawtubes 100 can function at close to full power. Typically, an array 400 of drawtubes 100 can produce rated power for incoming winds that fall within two triangular regions, 90 degrees wide, on each side of the array 400. In most favorable sites, there are prevailing wind patterns in opposed directions, for example onshore and offshore breezes.

Although an array of the drawtubes 100 of FIG. 2 have been illustrated in FIG. 6 many other array configurations may be used. The leading edge 30 and/or scoop member 40 may not be in a one-to-one ratio with the number of tubular members 20. For example, in an alternative embodiment, a system can use a single substantially planar leading edge member 30 to serve a plurality of tubular members 20.

In FIG. 3, the substantially planar leading edge member 30 and the scoop member are combined into one surface. In other words, the substantially planar leading edge member 30 and the scoop member 40 are simultaneously both the leading edge for one tubular member 20c and the scoop for the other tubular member 20d. Thus, when the wind direction changes, the roles of the combined substantially planar leading edge member 30 and the scoop member 40 change. An array of the drawtubes 10 of FIG. 1 may be assembled end-to-end, or longitudinally, in this same fashion using one leading edge and/or scoop between every two tubular members.

In addition, the linear arrangement as shown in FIG. 4, or the staggered arrangement as shown in FIG. 3, wherein the leading edge and/or scoop shares a surface with its two neighboring tubular members, also decreases the cost of materials. Each of these choices, as example models of array connectivity, offers its own advantages and may be better suited to different conditions in the field. In addition, it can be appreciated that an array of drawtubes can be constructed with two sets of features, those inherent to a lateral array, and those inherent to a longitudinal array, by combining both designs into one array.

However, it can be appreciated that the array need not be linear or staggered. For example, the outline of the array can be curved or in a circular fashion. In addition, as long as the distance between tubular members 20 is equal to or more than about seven times their diameter, the tubular members 20 can be placed downwind of other tubular members 20 in the same array, as in a circular lateral array. For example, a three-dimensional version of a circular array can be a spherical or hemispherical array. This would involve tubular members 20 in arrays in both the lateral and longitudinal directions, and would look like the frame of a geodesic dome.

The tubular members 20 are generally placed vertically in arrays. However, it can be appreciated that in an alternative embodiment, at least two tubular members 20 can be arranged horizontally and assembled together in an end-to-end fashion in an array. Then at least two tubular members 20 share a substantially planar leading edge member and/or scoop member.

In an alternative embodiment, a plurality of smaller drawtubes 10, 100, 200, 300 can be implemented instead of a single drawtube 10, 100, 200, 300 if the overall height of a wind system is a concern. The plurality of drawtubes 100 can be arranged either in a vertical or horizontal arrangement, wherein the total or sum of the electrical or mechanical energy product of the smaller drawtubes 100 in the array can equal the total power of a single drawtube 100 having substantially larger dimensions, without incurring the dimensional penalties of the single, larger drawtube 100.

In addition, it is often found that a plurality of smaller drawtubes 100 is also easier to manipulate than a single, larger drawtube 100. It can also be appreciated that the drawtubes 100 can be designed so that each drawtube 100 can be easily lowered for maintenance or inspection. Generally, there is no limit to the size or number of drawtubes 100 included in an array and the number of drawtubes 100 will depend on the overall objectives and the availability of materials. For example, a plurality of very small drawtubes 100, formed from extruded aluminum, can be a practical solution in a mesh-like or a chain link fence array.

Movable Systems

Figure 7:
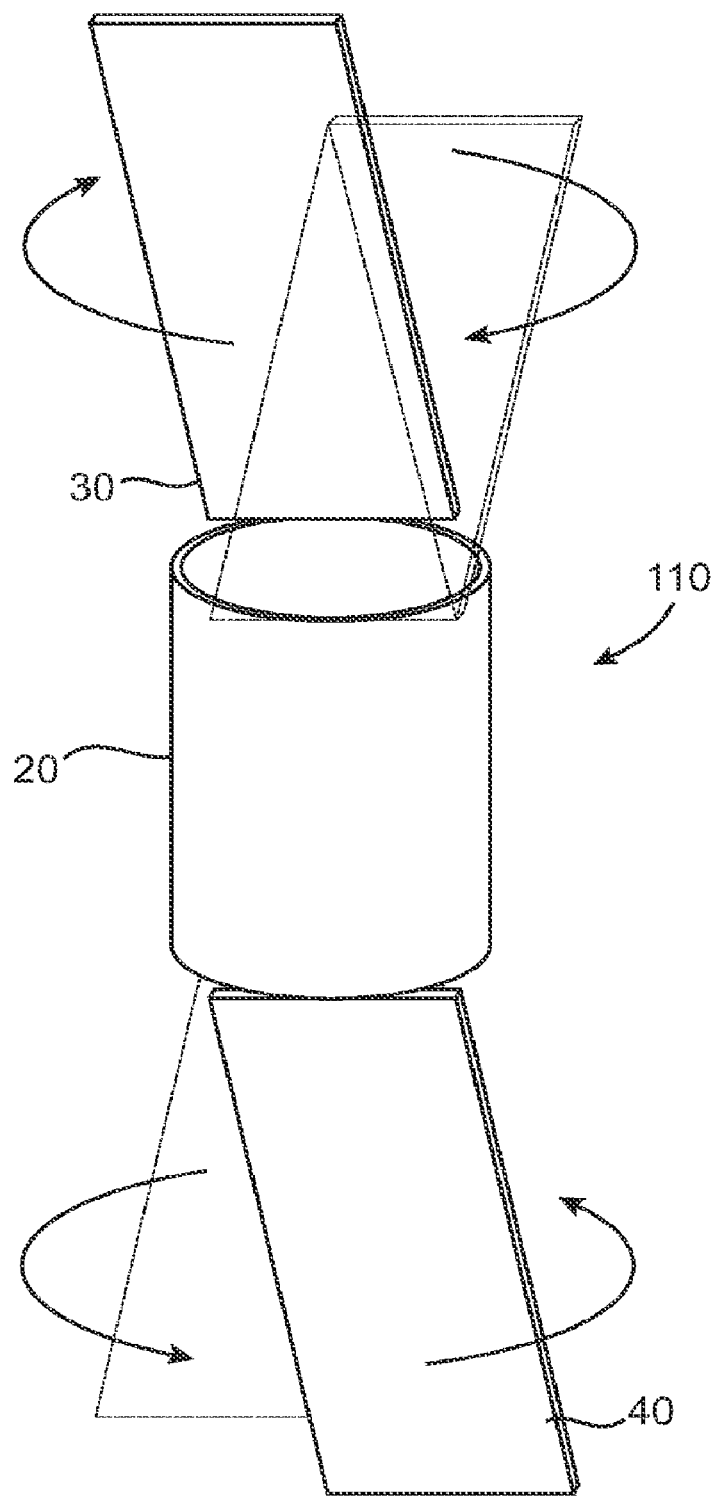
FIG. 7 is a perspective view of an alternative embodiment of an omni-directional compound drawtube with a rotating leading edge and scoop.

As described above, in one embodiment the substantially planar leading edge member 30 and scoop member 40 are perpendicular to the prevailing wind or airflow. However, if the wind directions are not consistent, an alternative embodiment as shown in FIG. 7 can be implemented. As shown in FIG. 7, a single compound drawtube 110 is constructed in a fixed position. In this embodiment, the substantially planar leading edge member 30 and the scoop member 40 rotate independent of the tubular member 20 to face into the wind. The substantially planar leading edge member 30 and the scoop member 40 are rotated utilizing either a motorized linkage, or through aerodynamic means by placing the centers of aerodynamic pressure for the scoop and the leading edge aft of the pivot points. In this embodiment, the scoop member 40 and the substantially planar leading edge member 30 do not serve as both a scoop and a leading edge, such that the substantially planar leading edge member 30 and the scoop member 40 can be optimized for its own function. The scoop member 40 and the substantially planar leading edge member 30 can be inclined aft at an angle, between about 0 degrees to about 60 degrees and generally about 33 degrees aft, with respect to the longitudinal axis of the tubular member.

The system 110, as shown in FIG. 7, is omni-directional and it operates equally well under winds from any direction. Furthermore, the tubular member 20 can be structurally fixed in one position for increased strength. In an alternative arrangement, the leading edge and scoop can be fixed while the tubular member can be canted and rotatable to provide a drawtube, which is convertible to two opposite directions.

In an alternative embodiment, such as the embodiments of FIGS. 1 and 4, the entire drawtube 10, 300 including the tubular member(s) 20, the substantially planar leading edge member 30, and the optional scoop member 40 are rotatable. The drawtube 10, 300 rotates utilizing a set of bearings centered on the longitudinal axis. The drawtube 10, 300 can be motorized to face into the wind, or, alternatively, the center of the aerodynamic pressure could be placed aft of the pivot points.

In another embodiment, as shown in FIGS. 8A and 8B, the system can be transformed, through sliding or rotating panels. FIG. 8A shows a stylized system 410 composed of a plurality of sliding panels 130, 140 mounted on the sides of a rectangular, tubular member 120 or the multiple-sided approximation of a cylinder. As the wind direction changes, the sliding panels 130, 140 slide up or down, as shown in FIG. 8B to form the substantially planar leading edge member 130 and the scoop member 140. This system is also omni-directional. These alternate embodiments are not meant to be all inclusive, but are intended to show that many other manifestations of the basic design are possible and practical without changing the process as described in this application.

Embedded Drawtubes

Figure 9:
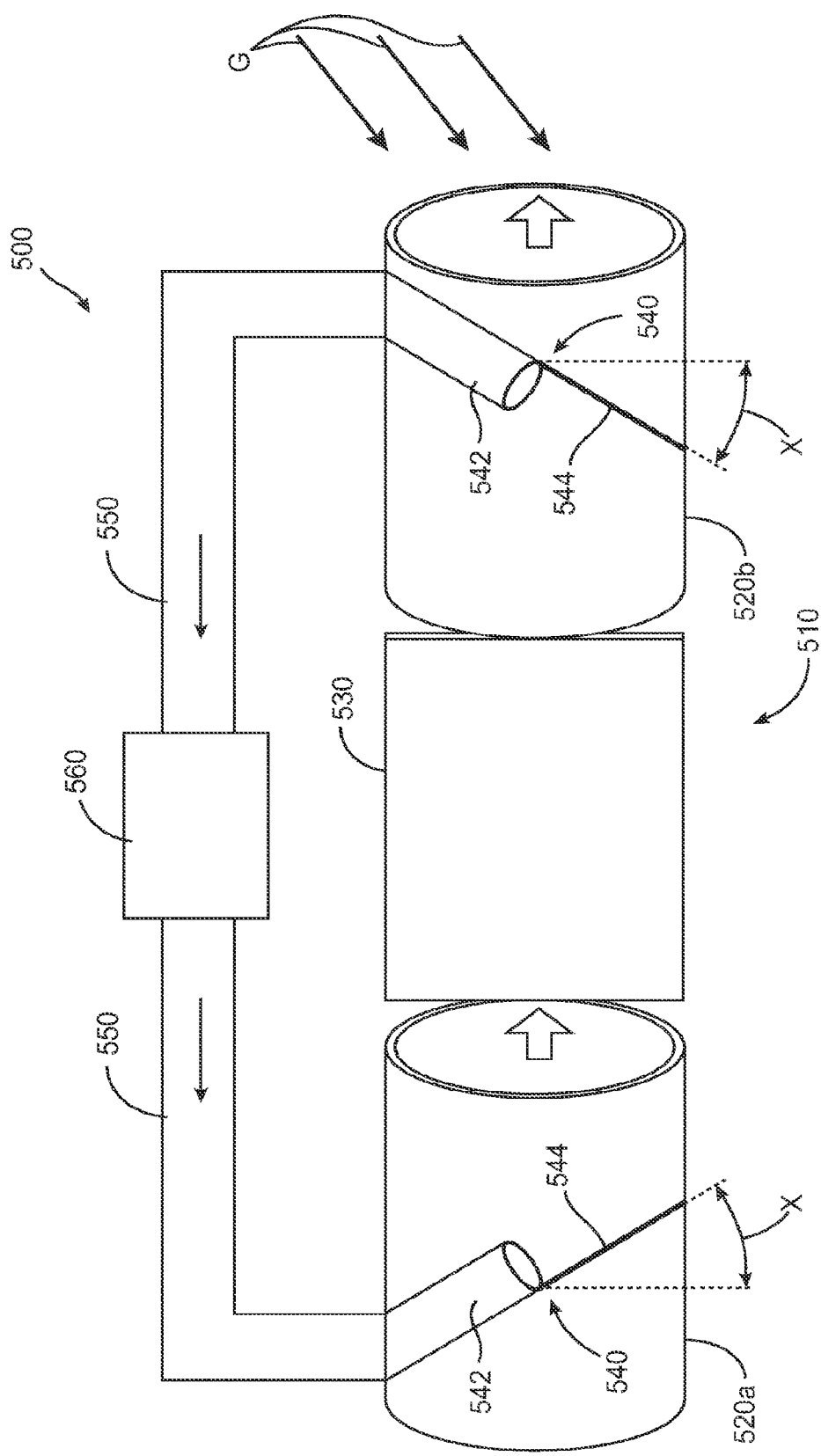
FIG. 9 is a perspective view of a system with embedded simple drawtubes according to one embodiment of the present invention.

FIG. 9 shows an alternative embodiment of a system 500 for collecting energy from wind in the form of an embedded drawtube in which one or more embedded inner drawtubes are positioned within the tubular members, or plenum, of an outer drawtube, or system. An embedded drawtube may include either a simple or compound drawtube or an array of simple or compound drawtubes that are actually placed inside the tubular member of a larger drawtube or system. The embedded drawtubes are installed in place of the energy conversion device in the tubular members of the larger system. This additional level of energy collection and concentration can be used where the primary, or larger stage, drawtubes or array of drawtubes can be constructed inexpensively. The embedded drawtube system yields doubly reduced static air pressures which, when compared to the outside static pressure, or especially an increased outside static pressure through the use of a scoop, will drive a smaller energy conversion device within the secondary embedded drawtube system at a much higher energy level.

The embedded drawtube system 500 of FIG. 9 includes a compound drawtube 510 having two tubular members 520a, 520b and a leading edge/scoop 530. The primary drawtube 510 is constructed in this example as a bidirectional drawtube in which one of the tubular members 520a operates with the leading edge 530 with the wind direction out of the page as shown by the arrows G. When the wind is out of the page, the other tubular member 520b operates with the scoop 530 to generate airflow through the tubular member 520b in the direction shown. When the wind is reversed, the airflow through the tubular members 520a, 520b is also reversed. The embedded drawtubes 540 illustrated in FIG. 9 are the simple drawtubes of FIG. 1 and are placed across the airflow, or across the axis of the tubular members 520a, 520b. The inner drawtubes 540 may also be any of the compound drawtubes or drawtube arrays discussed above. The inner drawtubes 540 each include a planar leading edge/scoop 544 and a tubular member 542. The tubular member 542 is connected by an air passageway 550 to an energy conversion device 560.

The inner drawtubes 540 in the embedded drawtube system 500 have a small air plenum diameter and high pressure differential which allows the use of certain energy conversion devices 560 such as jet pumps which may not be possible at larger diameters and smaller pressure differentials. The use of a jet pump as an energy conversion device 560 is particularly beneficial as they have no moving parts and can be made to convert a bi-directional airflow to a unidirectional product airflow. The energy of a jet pump may be used directly to power a remote air conditioner, water pump, or other pneumatic device. In the embodiment of FIG. 9, the embedded drawtubes 540 are canted at an angle X with respect to a line perpendicular to the axis of the primary tubular member 520. Alternatively, the embedded drawtubes 540 can have a planar leading edge 544 which may be canted at the angle X. As described above, the angle of canting may be about 0 to about 45 degrees and is preferably about 33 degrees.

The primary drawtube 510 produces a high-energy airflow through the interaction of both high and low-pressure regions when the drawtube is placed within an airflow. The embedded secondary drawtubes 540 produce a volume of air with a static pressure reduced even further than the static pressure available within the air plenum of the primary drawtube. The smaller, secondary drawtube 540, once placed within the primary air plenum, receives an enhanced airflow possessing up to about five times the energy density of the outside air stream. Since the system efficacy increases with the apparent wind speed, the embedded or secondary drawtube 540 creates an additional deep static pressure reduction. When this is compared to the outside ambient air, a twofold reduction is realized. This, in turn, creates increased airflow within the secondary air plenum.

An energy conversion device as shown and described herein, can be inserted within the tubular member 542 of the embedded drawtube 540 or remote from the system as shown in FIG. 9.

The primary drawtube 510 and embedded drawtube 540 preferably have an aspect ratio of about 6:1 as described above. In one embodiment, the length to diameter restriction, coupled with the preferred leading edge aft inclination of about 33 degrees, leads to an embedded secondary drawtube 540 having a diameter of 5/24 of, or 0.2083 times the diameter of the primary drawtube 510. The internal area of the embedded secondary drawtube 540 would, in this embodiment, be about 1/23 of the internal area of the primary drawtube 510.

It can be appreciated that the design tradeoff for embedding drawtubes depends on the cost of construction, the characterization of available propellers and generators, and the time weighted average of the expected wind regime.

If, for instance, an array of primary drawtubes can be constructed inexpensively, embedded secondary drawtubes can be effectively inserted. The added benefits are that smaller diameter collection plenums and energy conversion devices can also be used. Also, the embedded secondary drawtubes 540 are in a more controlled environment, with winds always approaching at a preferred or correct angle. Although primary and secondary drawtubes are shown, a system may include tertiary or additional embedded drawtubes inserted inside the secondary drawtubes.

Figure 10:
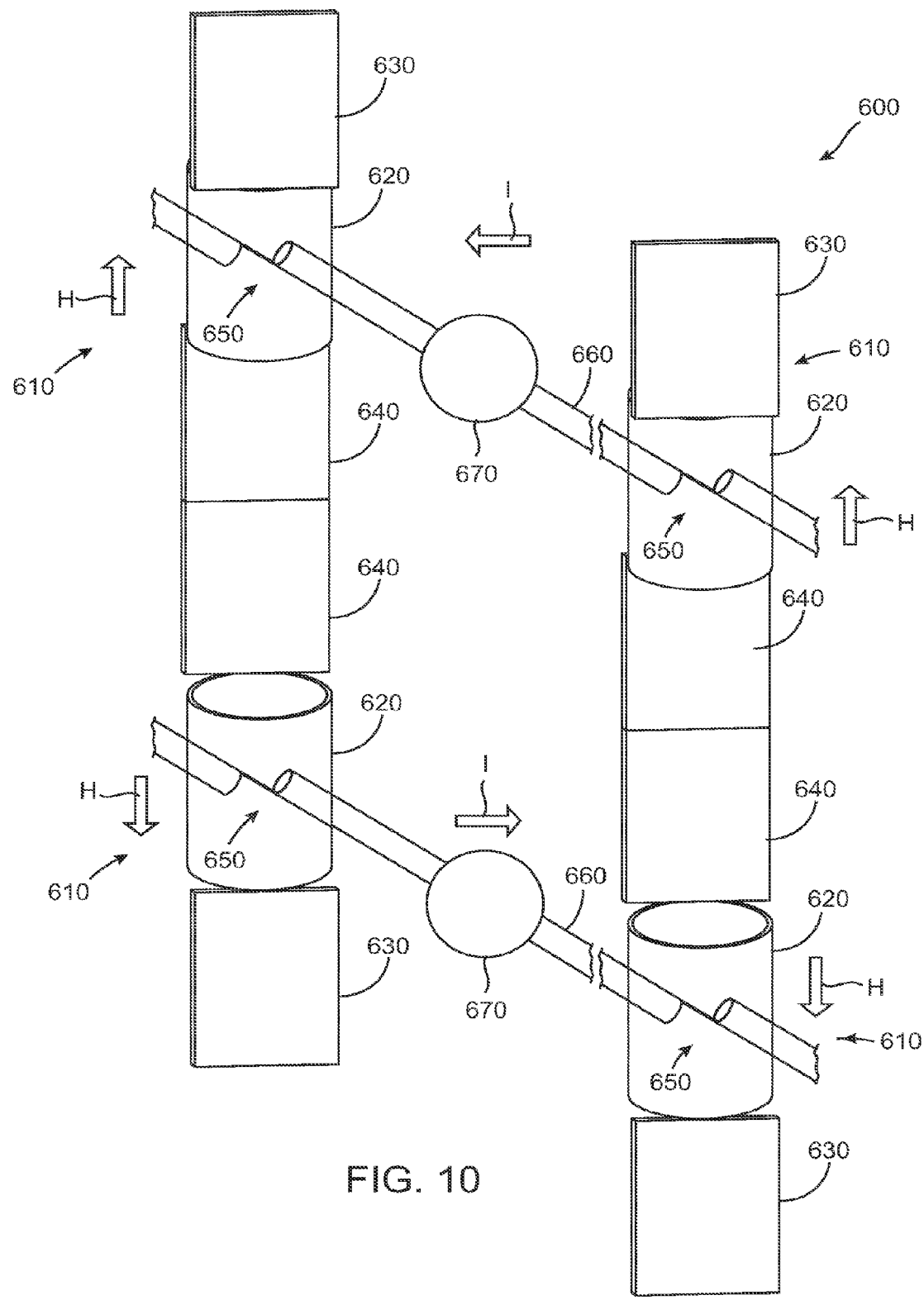
FIG. 10 is a perspective view of a system including an array of primary compound drawtubes with embedded compound drawtubes according to an alternative embodiment of the present invention.

FIG. 10 shows a modular unit or system 600 for collecting energy from the wind having embedded drawtubes. As shown in FIG. 10, each vertical row contains two larger, or primary, compound drawtubes 610. The drawtubes 610 each include a tubular member 620, a leading edge 630, and a scoop 640. The drawtubes 610 are arranged such they share a common the scoop member 640. Within each of the primary tubular members 620 is an embedded compound drawtube 650 of the type illustrated in FIG. 3. However, other embedded drawtube embodiments, or arrays of embedded drawtubes may be used. The two vertical rows of the modular units are staggered vertically, so that a preferred 33-degree inclination is achieved when embedded drawtubes 650 are connected via the secondary air plenums 660 to the energy conversion devices 670.

Of course, the energy conversion device 670 could assume many forms, within or outside the embedded drawtubes 650. Since the two primary compound drawtubes 610 in a vertical row face in opposite directions, the airflow within each primary drawtube 610 is also in opposite directions as shown by the arrows H. This causes the flow in each embedded drawtube 650 to flow in opposite directions as well with the flow through the secondary air plenums 660 in the direction of the arrows I.

As shown in FIG. 10, it is assumed that the wind is moving toward the module from the direction of the observer. Therefore, the substantially planar leading edge member 630 is positioned forward and the scoop member 640 is positioned aft. If the wind reversed directions, the internal flows would reverse and the substantially planar leading edge member 630 and the scoop member 640 would reverse roles as well as the leading edges of the embedded drawtubes 650.

Also, an array of this type can be assembled using one or more of these modules, with additional modules added either vertically or horizontally, or both. The module can be constructed so that two functional modules could be simply plugged together. As previously mentioned, other types of arrays, embedded or not, such as those presented in this application, are both practical and possible.

The drawtube arrays illustrated are merely a few examples of the types of arrays, which are possible. The drawtube arrays may be connected such that a plurality of drawtubes are connected to a single air passageway for connection to one or more remote energy conversion devices. For example, a plurality of drawtubes of FIG. 1, 2, 3 or 4 arranged horizontally, one above the other, may be interconnected by a pair of vertically oriented air plenums formed at the ends of the arrays.

Figure 11:
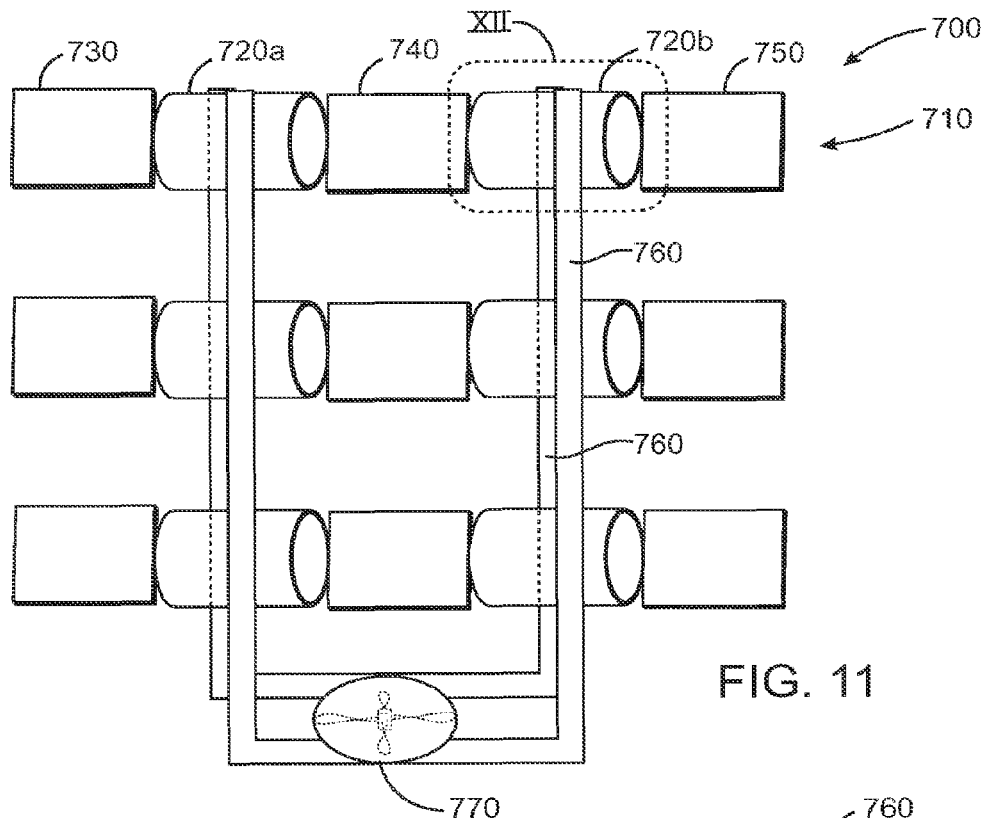
FIG. 11 is a side view of a system including an array of primary compound drawtubes with embedded compound drawtubes and a single energy conversion device.
Figure 12:
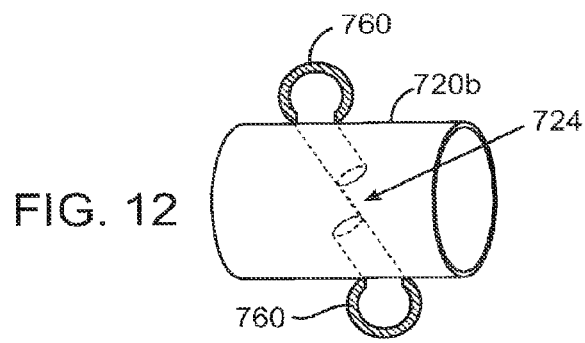
FIG. 12 is a top view of one of the primary tubular members of FIG. 11 with an embedded compound drawtube.
Figure 13:
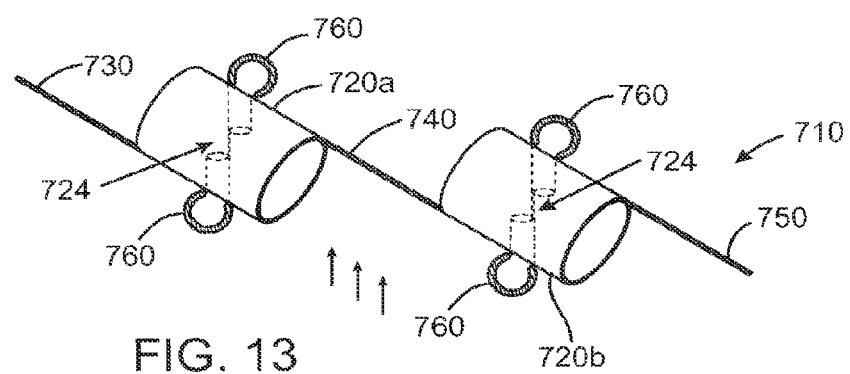
FIG. 13 is a top view of the system of FIG. 11.

FIG. 11 illustrates a system 700 of compound drawtubes 710 where each of the compound drawtubes is arranged with two or more tubular members 720a, 720b and three or more leading edge/scoop members 730, 740, 750. The tubular members 720a, 720b and planar members 730, 740, 750 are arranged in a staggered arrangement as illustrated in the top view of FIG. 13. As shown in FIG. 12, each of the tubular members 720a, 720b contains one or more compound drawtubes 724 positioned at an angle within the tubular member as described in further detail in the embodiment of FIG. 10. The ends of these embedded compound drawtubes 724 are connected to air passageways 760 (see FIG. 11) which run vertically along the sides of the tubular members 720a, 720b. The air passageways 760 connect the embedded drawtubes 724 to an energy conversion device 770 which may be positioned below the array 700, either on the ground or underground. In the configuration of FIG. 11, the air passageways on one side of the array will have an airflow in one direction, while the air passageways on an opposite side of the array will have an airflow in an opposite direction.

Eave-Mounted Plenum

Figure 14:
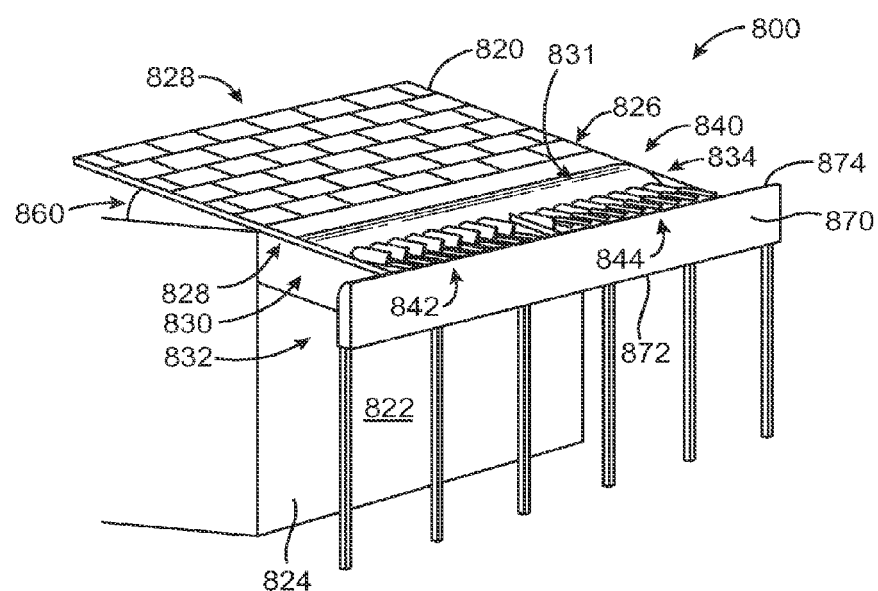
FIG. 14 is a perspective view of an eave array system according to another embodiment of the present invention.

FIG. 14 illustrates an eave-mounted system 800 according to another embodiment of the present invention. As shown in FIG. 14, the eave-mounted system 800 includes a pair of complementary drawtube arrays 840 and a leading edge member 870. The complementary drawtube arrays 840 are comprised of a plurality of standard drawtubes 10, as shown in FIG. 1, which is comprised of a first drawtube array 842 and a second drawtube array 844. The first and second drawtube arrays 842, 844 are preferably complementary, wherein leading edge 30 is on an upper surface of the tubular members 20 on one array 844 and on a lower surface of the tubular members 20 on the other array 842. It can be appreciated that complex drawtubes 100, 200, 300 as shown in FIGS. 2-4, 8A and 8B can also be used to form the complementary drawtube arrays 840. The system 800 also contains an energy conversion device 70 (not shown) for converting the airflow into rotational mechanical energy, which can be in the form of a prop and/or a generator as shown in FIG. 1.

In accordance with one embodiment, the drawtubes 100, 200, 300 in each array 840 are preferably parallel to one another, however, the drawtubes can be angled approximately 22.5 degrees outward with respect to the perpendicular position as shown in FIG. 14. In accordance with this embodiment, the internal airflows are less impeded since the airflows don't have to negotiate a full 90-degree turn from the plenum to the drawtubes. It can be appreciated that the angle can vary from about 0 to 90 degrees and is more preferably between about 15 and 45 degrees, such that the array of drawtubes 840 can be slanted for better performance.

Figure 15:
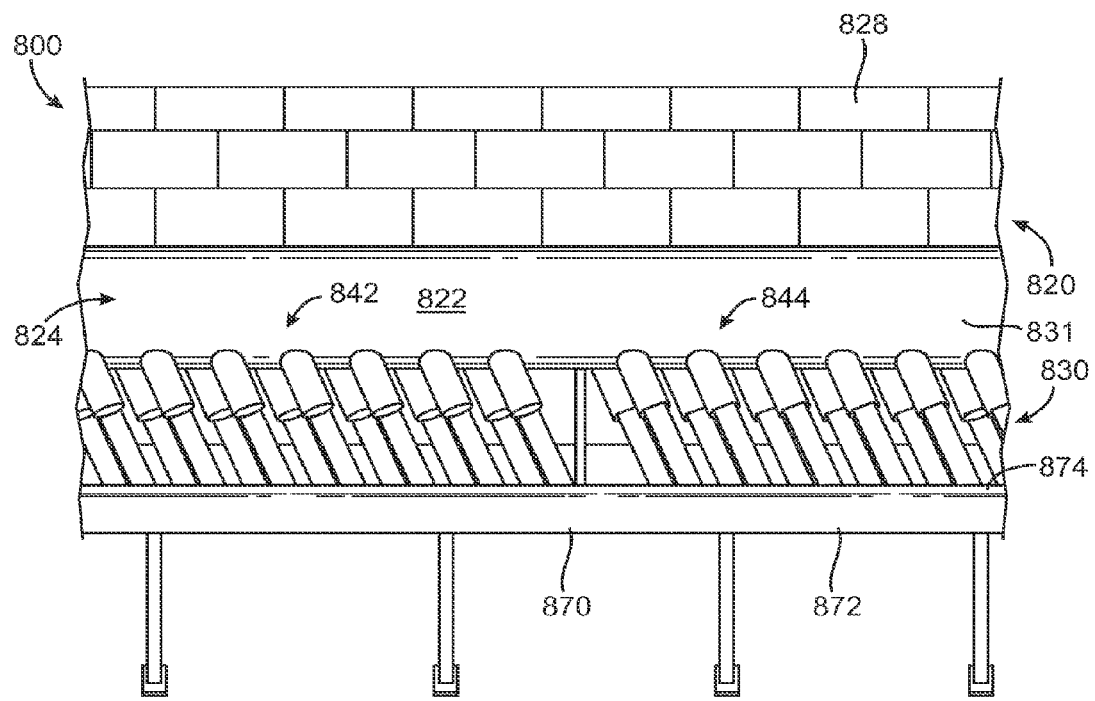
FIG. 15 is a perspective view of the eave array of FIG. 14 from another perspective.

The energy conversion device 70 is preferably located at a center point between the two complementary drawtube arrays 842, 844. It can be appreciated that a turbine (not shown) or other suitable energy conversion device 70, which can be installed on existing (or new) structures or buildings 820 with minimal impact is preferable. However, the turbine (not shown) should also be human compatible. It can also be appreciated that although the energy conversion device 70 has typically been shown within the tubular member 20 of the standard drawtube 10, with the system 800 as shown in FIGS. 14 and 15, the energy conversion device 70 is preferably placed at a remote location as illustrated in U.S. Pat. Nos. 5,709,419 and 6,239,506, which are incorporated herein by reference in their entirety.

As the wind encounters the structure or building 820, it creates a positive pressure envelope on the windward face 822 that peaks at a point about ⅔ of the way up the wall 824. It can be appreciated that this can be caused by the conversation of the dynamic pressure, or ram, air to high static pressure as it slows down while approaching the stationary wall 824. Meanwhile, typically, each of the other faces (of the structure or building 820) exhibit a negative pressure envelope. However, the highest negative pressure is also typically on the windward side and occurs at the corner, or edge line 826, of the roof 828 where it meets the wall 824. The negative pressure zone extends up above and forward of the building 820 and into the wind. It has been shown that a leading edge vortex is one of the primary reasons for the strong negative pressure zone.

As set forth above, it can be appreciated that the total pressure of any enclosed volume of air is equal to the sums of the dynamic, static and potential pressures, and is also equal to a constant. In any given volume of air this may or may not apply, however, it will always be true in at least two cases. The first case is that the volume of air in question is enclosed, or contained. In other words, air of higher pressure is mechanically prevented from rushing in to equalize the air of a lower pressure region. The other case is where the air is flowing and the flow lines bend. In this second case, the angular momentum, or centripetal force, of the moving air prevents it from equalizing pressure differentials. Low pressures, for instance, are characteristically found in cyclonic storms. In fact, the tube-like vortices described here fit both exceptions, and through this process, extremely low pressure zones can be created.

It can be appreciated that a building integrated or eave-mounted system 800, which is comprised of a plurality of standard drawtubes 10 forming a drawtube array 840 can take advantage of the naturally occurring high and low pressure zones found on the windward side 822 of a building 820. A channel 830 is formed between a high positive pressure zone 832 and a high negative pressure zone 834 and promotes an energetic airflow.

In practice, air from the high static pressure zone rushes up through the array 840 to equalize the low pressure zone. As the airflow passed through the arrays 840, it engages the drawtubes 10 and creates low pressure inside the drawtubes 10 in the left array 842 and high pressure in the right array 844. This in turn creates an airflow within the plenum 831 traveling from the high pressure, on the right side, to the low pressure, on the left side. As the airflow passes through the energy conversion device 70 in the form of a prop/generator 70 (not shown) located at the midpoint or center point between the first and second drawtube arrays 842, 844, the airflow turns a prop of the energy conversion device 70 to generate electricity.

It can be appreciated that a faceplate or other aesthetic device (not shown) can be placed in front of the plenum 831 to create a smoother channel, 830 for the airflow. In accordance with one embodiment, the plenum 831 can extend the length of the front of the building and is in front of the building. The plenum 831 connects to one end of the drawtubes 10 and is preferably closed at both ends. The roofline can be extended to meet the faceplate (not shown) thus forming a smooth transition and concealing the plenum 831. The channel 830 contains the drawtubes 10, and allows the air to flow from below the arrays, up and forward (in front of the hidden plenum) and out forward and above the new corner of the building, the edge of the faceplate and the extended roofline.

In one embodiment, the system 800 of eave mounted plenums can be added to an existing structure 820 by merely extending the roofline 828. It can be appreciated that one advantage of the eave-mounted plenum system 800 as shown in FIG. 14 is that the system 800 has no visible moving parts.

FIG. 15 illustrates the transformation of an existing building 820 having an eave-mounted plenum system 800, which includes a pair of drawtube arrays 842, 844. As shown in FIG. 15, the eave-mounted plenum is simply an extension of the existing roofline 826. The pitch 860 on the roof 828 is preferably moderate, in the range of 0 to 8 in 12, or from 0 to about 33.75 degrees. The eave-mounted plenum system 800 in the form of a pair of drawtube arrays 842, 844 should also be mounted on the building side or face 822 facing the prevailing winds (W). It can be appreciated that typically, the best performance will be when the face 822 of the building 820 is not actually perpendicular to the winds (W), but at approximately 33 degrees off from perpendicular, or about 57 degrees with respect to the winds. In addition, it can be appreciated that reducing the number and size of obstacles, which might block the wind can also improve the performance of the eave-mounted plenum system 800.

The leading edge member 870 is designed to present a bluff body to the approaching wind. The bluff body or leading edge member 870, as described in previous applications, creates powerful tube-like vortices responsible for the deep low pressure zones. The leading edge member 870 has a lower surface 872 and an upper surface 874, wherein the leading edge member 870 is designed to discourage vortex formation on the lower surface 872 while encouraging strong vortices on the upper surface 874.

For this eave mounted system 800, the air is accelerated about two-fold before it encounters the drawtubes 10 in the array 840. It can be appreciated that other implementations based on the system 800 of arrays 840, as previously taught, are possible. In all cases, the described arrays 840 are comprised of a multiplicity of simple and/or complex drawtubes 10, 100, 200, 300. The description above is just one possible example of a pre-conditioning device or system used in conjunction with an eave-mounted plenum system 800, which utilizes a pair of drawtube arrays 842, 844.

It can be appreciated that the eave-mounted system 800 is not confined to a horizontal axis. In accordance with one embodiment, the plenum 831 can be hidden in a vertical column-like structure that is incorporated into the architecture of a building or home. Thus, an entire building can be used as a wind collector and concentrator rather than just the limited space along the eave.

Disk Collector

Figure 16:
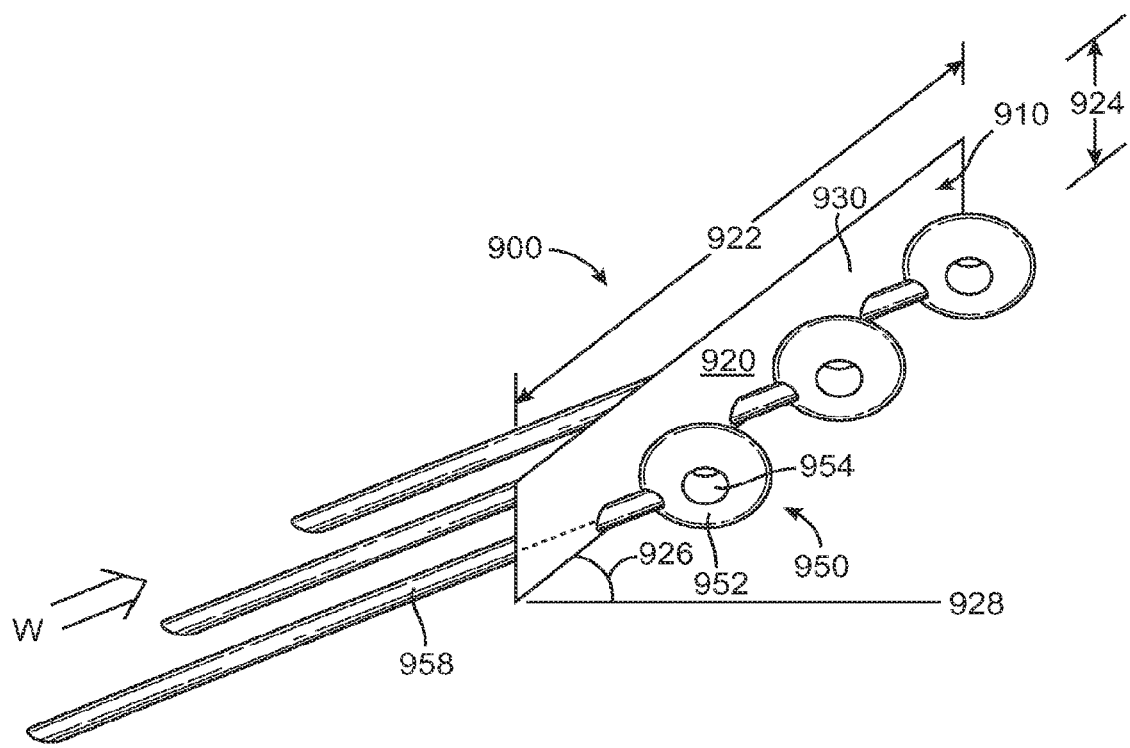
FIG. 16 is a perspective view of a bluff body for converting airflow into mechanical or electrical energy using a plurality of disk collectors.

FIG. 16 illustrates an alternative embodiment of a system 900 for converting an airflow into mechanical or electrical energy using a leading edge member or bluff body 910. The leading edge member or bluff body 910 produces and utilizes low pressure zones through an interaction with a volume of moving air and at least one collector 950 to generate mechanical or electrical energy. It can be appreciated that the plate 920 can have a slight curvature or other suitable shape, which presents an obstacle to the wind. As shown in FIG. 16, the leading edge member or bluff body 910 presents an obstacle to the wind, such that the airflow is forced to accelerate around the obstacle. In accordance with one embodiment, the leading edge member or bluff body 910 is a substantially planar or predominantly flat plate 920 having an aspect ratio, or width 922 to height 924, of approximately 6:1. It can be appreciated that the leading edge member or bluff body 910 having an aspect ration (i.e., width 922 to height 924) of approximately 6:1 produces an ideal case resulting in very strong leading edge vortices. The strong, tube-like vortices are the result of pronounced accelerations as the wind rushes around the substantially planar or predominantly flat plate 920 or other suitable obstacle. It can be appreciated that high wind or airflow velocities in combination with a rotary, vortex structure or system can combine to create extremely low pressure zones. In use, the angular momentum of the air prevents it from rushing in to equalize the pressure, which can also be explained as centripetal force.

As previously shown in FIG. 1, with a standard drawtube 10 comprised of a cylindrical device or tubular member 20, which is combined with the at least one leading edge member 30 in the form of a substantially flat plate creates a single bluff body with an overall ideal aspect ratio (i.e., height to width) of about 6:1. The cylinder or tubular member 20 has an open face or outlet 22, which when presented to the low pressure of the vortex interior, captured and conducted that low pressure for further use. In addition, it can be appreciated that the leading edges can have any suitable cross sectional shape and although in accordance with one embodiment the leading edge is substantially flat, it can be appreciated that the leading edge need not be flat and other suitable surface configurations can be used.

Alternatively, if the leading edge member or bluff body 910 is perpendicular to the wind, alternating and counter-rotating vortices are formed from side-to-side, move around and behind the leading edge member or bluff body 910 and then shed to flow away with the wind. This forms the familiar vortex street behind the leading edge member or bluff body 910. It can be appreciated that in accordance with this embodiment, vortex shedding is undesirable. Therefore, the leading edge or bluff body 910 is preferably positioned such that it is 33 degrees off the perpendicular to the prevailing winds.

In a further embodiment, it can be appreciated that at certain angles of inclination 926, of between about 15 to 50 degrees from perpendicular and more preferably at an angle of inclination of about 33 degrees from perpendicular 928 as shown in FIG. 16, with respect to an approaching airflow or wind (W), the formed vortices remain attached to the bluff body 910. In this case, the vortices would remain formed and positioned behind the bluff body 910 and in line with approximately the one-quarter width of the narrow dimension of the bluff body 910. It can be appreciated that any suitable cylindrical device or tubular member 958 can capture the low pressure from both these vortices and increase the energy potential by about two-fold. It can be appreciated that any well designed drawtube 10, 100, 200, 300 can increase the energy density inside the drawtube to about four (4) times that of the outside air. For example, the two-fold increase, as discussed in the Eave turbine implementation, is in addition to that and is a result of the pressure differentials induced by the building itself. Therefore, an increase of more than two-fold and probably in the range of four (4) fold could be expected.

The relative size relationships between the flat plate or leading edge 30 and the cylindrical or tubular member 20, for a simple drawtube 10 as shown in FIG. 1 preferably has an aspect ratio (i.e., height to width) of 6:1, wherein the optimal lengths are approximately three (3) units (i.e., meter or yards) each for the flat plate or leading edge 30 and the cylinder or tubular member 20. However, it can be appreciated that for a complex drawtube 100, 200, 300, as shown in FIGS. 2-4, the ratio is preferably two units each for the two leading edge or flat plates 20 and the single tubular member 30. However, in the case of a flat plate bluff body 910, the entire six (6) units are the substantially or flat plate 920. It can be appreciated that the leading edge 920 can be flat or substantially flat plate or any suitable device or member, which creates the low pressure zones for this implementation.

In accordance with one embodiment, as shown in FIG. 16, the bluff body 910, having a flat plate or substantially planar leading edge 920, when placed in an airflow, creates strong leading edge vortices. It is preferable that the flat plate 920 is also 33 degrees from perpendicular to the winds, which assures that the created vortices remain attached. Although the longitudinal axis of the vortices remain aligned with the flat plate 920, the angular path of the air remains aligned with the wind, which results in a flattened vortex. As shown in FIG. 16, a plurality of collectors 950 can be positioned behind the flat plate or bluff body 910. It can be appreciated that the plurality of collectors 950 are preferably aligned with the air path to minimize conflict, drag and vortex disruption.

The collectors 950 are comprised of a disk 952 having an opening or exhalation port 956 within a center portion 954 of the disk 952. The exhalation port 956 connects to a cylindrical device or tubular member 958. The cylindrical device or tubular members 958 are, in turn, connected to a central plenum (not shown) to collect and concentrate the low pressure for further use in a manner similar to the methods described previously. Alternatively, each tubular member 958 can contain an energy conversion process or device 70, (e.g., a prop/generator for instance) to produce electrical or mechanical energy.

Figure 17:
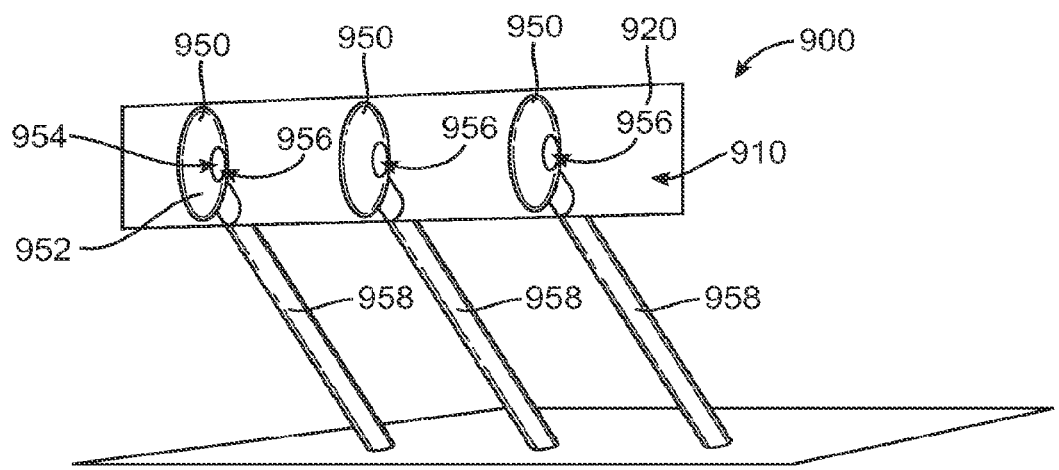
FIG. 17 is another perspective view of the bluff body for converting airflow into mechanical or electrical energy using a plurality of disk collectors as shown in FIG. 16.
Figure 18:
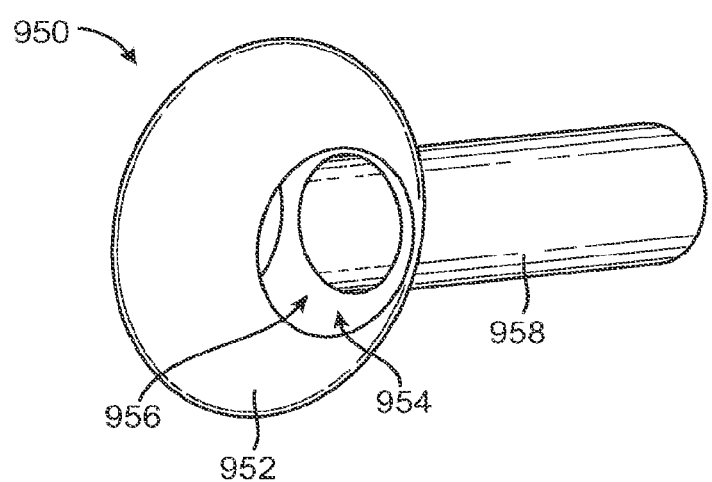
FIG. 18 is a perspective view of a disk collector used with a bluff body for converting airflow into mechanical or electrical energy.

As shown in FIGS. 16-18, the collectors 950 are preferably placed directly behind the centerline of the flat plate (i.e., leading edge) or bluff body 910, as are the cylindrical section or tubular member 20 of a drawtube 10, 100, 200, 300. In addition, the exhalation port or opening 956 of the collector 950 is preferably large enough to encounter both low pressure zones created by the two attached leading edge vortices. If each vortex were to be targeted separately, and in doing so perhaps capture lower pressures yet, the disk opening 956 should be aligned with the centerlines of each vortex, or at about 0.20 to 0.30 and more preferably about 0.25 width lines of the flat plate. It can be appreciated that the cylindrical section of a drawtube 10, 100, 200, 300 can be flattened to a disk 950 or other suitable shape and/or configuration, if a means is provided to connect the disk or disk collector 950 to a plenum. It can be appreciated as shown in FIGS. 16-18, the interior of the disk collector 950 is an extension of the plenum.

In the drawtube 10 analogy, a complex drawtube 100, 200, 300 can be created to also incorporate the benefits of ram air, or static high pressure air. To accomplish this, the plenums are preferably connected to the center of the flat plate 920, or the closest location with high static air pressure.

FIG. 17 illustrates another embodiment of a bluff body 910 comprised of a substantially planar, flat or predominantly flat plate 920 and a plurality of collectors 950. The flat plate 920 produces and utilizes a low pressure zone through an interaction with a volume of moving air and the plurality of collectors 950 to generate mechanical or electrical energy. It can be appreciated that the plate 920 can have a slight curvature or other suitable shape, which presents an obstacle to the wind. In one preferred embodiment, the energy conversion device 70 can be at the center of the plenum, about halfway between the disk 950 and a windward side 930 of the leading edge member 910. As shown, the vertical axis of the disk collectors 950 are perpendicular to the ground which makes them perpendicular to the longitudinal axis of the leading edge or bluff body 910. In accordance with one embodiment, the horizontal axis are preferably aligned with the prevailing winds and are preferably about 33 degrees off from perpendicular to the horizontal, or longitudinal axis, of the leading edge or bluff body 910.

FIG. 18 illustrates a single collector 950 for use with the bluff body 910 as shown in FIGS. 16 and 17. As shown in FIG. 18, the collector 950 is comprised of a disk 952 having an opening or exhalation port 956 within the center portion 954 of the disk 952. The tubular member 958 is preferably connected to a central plenum (not shown) to collect and concentrate the low pressure for further use in a manner similar to the methods described previously.

It can be appreciated that the system 900 as shown in FIGS. 16-18 can further include a means for positioning the leading edge or bluff body 910 into the airflow, wherein the leading edge member or bluff body 910 is facing substantially into the airflow. For example, a support structure, which can rotatably support the system 900, such that the support structure orients the system 900 so that the leading edge member or bluff body 910 is facing into the airflow. In addition, the system 900 can also include an airflow direction sensor (not shown) and a motor (not shown) for rotating the drawtube in response to the airflow direction sensor, as shown in FIG. 7.

Figure 19:
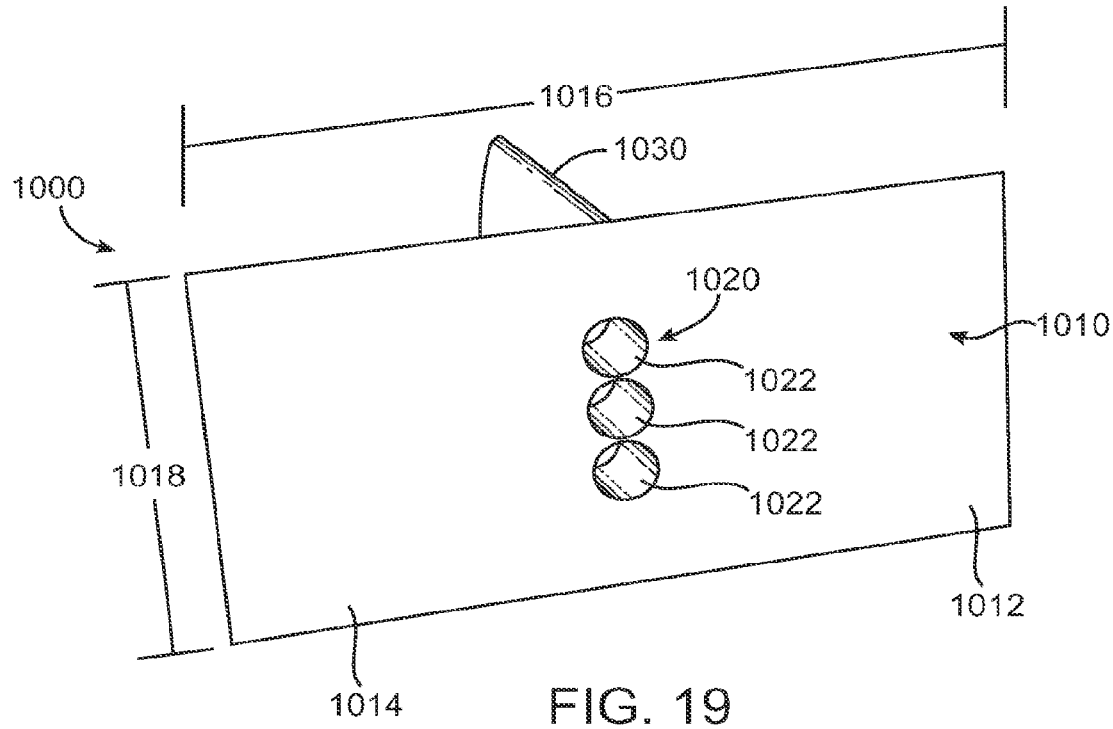
FIG. 19 is a perspective view of a further embodiment of a device for converting airflow into mechanical or electrical energy using a rectangular collector showing a portion of a bluff body extending for several multiples of the given drawing in the direction of the leading edge, thus creating a bluff body as seen by the wind.

FIG. 19 illustrates another embodiment of a system 1000 for converting airflow into mechanical or electrical energy using a collector 1010 having at least one port or opening 1020, which act as plenum. It can be appreciated that in accordance with one embodiment, the collector is preferably rectangular, however, any suitable shape can be used. As shown in FIG. 19, the at least one disk 950 (FIGS. 16-18) is replaced with a collector 1010 having at least one port or opening 1020. As shown in FIG. 19, the at least one port or opening 1020 preferably includes a plurality of ports or openings 1022, (as shown in FIG. 19, the system includes three (3) openings), which capture the high pressure air from a center portion of a relatively flat plate 1012, which forms a leading edge member 1014. The at least one opening 1020 captures the high pressure air, which is conducted through an energy conversion device (not shown) to a low pressure exhaust port 1040 on an opposite side of the leading edge member 1014. The low pressure exhaust port 1040 is preferably centered within a rectangular body 1030. It can be appreciated that the high pressure created on the windward side of the leading edge to will contrast with the low pressure created by the vortices and collected by the exhaust ports. In accordance with one embodiment, the body 1030 can be canted approximately 33 degrees from the longitudinal axis of the leading edge, 1010.

Figure 20:
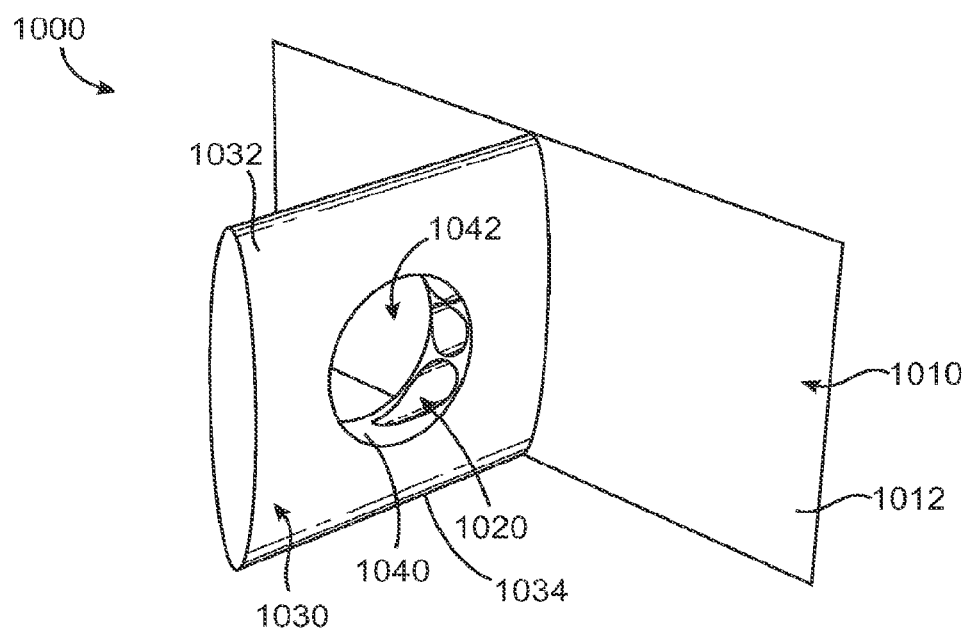
FIG. 20 is a perspective view of the system of FIG. 19 for converting airflow into mechanical or electrical energy using a rectangular collector showing a portion of a bluff body extending for several multiples of the given drawing in the direction of the leading edge, thus creating a bluff body as seen by the wind.
Figure 21:
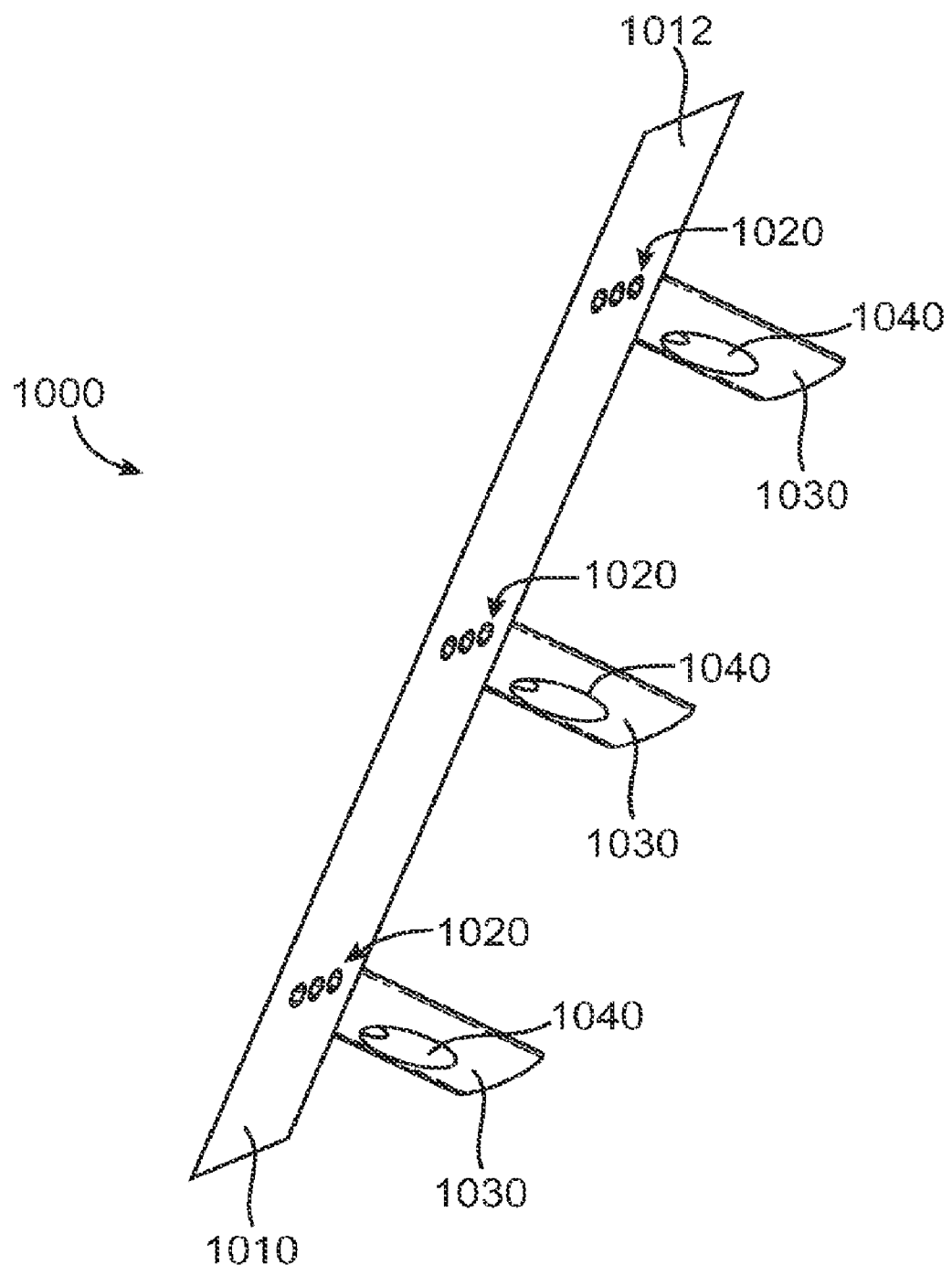
FIG. 21 is a perspective view of a further embodiment of a system for converting airflow into mechanical or electrical energy using rectangular collectors having a plurality of plenums showing a bluff body realized by the sum of several rectangular sections.

As shown in FIG. 19, the rectangular collector 1010 presents an obstacle (i.e., bluff body) to the wind, such that an airflow is forced to accelerate around the obstacle or alternatively through the at least one opening 1020. It can be appreciated that as set forth above, in one embodiment, the rectangular collector 1010 is a substantially planar or predominantly flat plate 1012 having an aspect ratio (i.e., length 1016 to height 1018) of approximately 6:1. It can be appreciated that the aspect ratio of the length 1016 to height 1018 is preferably between about 2:1 to 10:1, and is more preferably about 4:1 to 8:1 and most preferably about 6:1. However, it can be appreciated that the system 1000 as shown in FIGS. 19-21 can be used on a long fence or plurality of fences, e.g., along ridgelines or coastal regions. The strong, tube-like vortices are the result of pronounced accelerations as the wind rushes around the substantially planar or predominantly flat plate 1012 or other suitable obstacle. It can be appreciated that the high wind or airflow velocities in combination with a rotary, vortex structure or system can combine to create extremely low pressure zones. The openings 1020 can alternatively include an energy conversion device or embedded collection device (not shown), such as embedded drawtube 10 (FIGS. 9-13), installed internally.

FIG. 20 illustrates the system 1000 of FIG. 19 for converting airflow into mechanical or electrical energy using a rectangular collector 1010 having at least one opening 1020, and a low pressure exhaust port 1040 on the opposite side of the leading edge member 1014. As shown in FIG. 20, the low pressure exhaust port 1040 is preferably located within a center portion 1042 of the rectangular body 1030. As shown in FIG. 20, the rectangular body 1030 can include a rounded upper surface 1032 and a rounded lower surface 1034, wherein the rectangular body 1030 is configured similar to an airplane wing or airfoil with a centered exhaust port 1040. In accordance with one embodiment, the edges of the rectangular collector are rounded to cause minimal impact to the created vortices. It can be appreciated that once the vortices have been established or created, the system should not impede them. As shown in FIG. 20, the at least one opening 1020, and may include a plurality of openings 1022, wherein the openings 1022 extend from a front or windward side of the rectangular collector 1010 to the exhaust port 1040 located within the center of the rectangular body 1030. It can be appreciated that the at least one opening can be any suitable shape including round and/or oval.

It can be appreciated that the system 1000 as shown in FIGS. 19-21 can further include a means for positioning the leading edge or rectangular collector 1010 into the airflow, wherein the rectangular collector 1010 is facing substantially into the airflow. For example, a support structure, which can rotatably support the system 1000, such that the support structure orients the system 1000 so that the rectangular collector 1010 is facing into the airflow. In addition, the system 1000 can also include an airflow direction sensor (not shown) and a motor (not shown) for rotating the drawtube in response to the airflow direction sensor, as shown in FIG. 7.

FIG. 21 illustrates a system 1000 for converting airflow into mechanical or electrical energy using a rectangular collector 1010 having a plurality of openings 1020 with a plurality of exhaust ports 1040 and rectangular bodies 1030. As shown in FIG. 21, the rectangular collector 1010 having a plurality of openings 1020 having at least three (3) or more openings 1022. The plurality of openings 1020 preferably includes a plurality of openings 1022, which capture the high pressure air from a center portion of a relatively flat plate 1012, which forms a leading edge member 1014. As shown, it can be appreciated that the rectangular collector 1010 can be any relatively flat plate 1012 or bluff body, which forms a leading edge member 1014. In addition, an embedded drawtube 10 can be installed within the openings 1022. It can be appreciated that the implementations as shown are meant only as examples to show the possibilities available, not as limiting designs.

Sail-Energy Conversion Device

In FIGS. 1-21, each of the systems as illustrated include a bluff body or leading edge member, which is perpendicular or preferably, 33 degrees off from perpendicular to the wind, such that it creates what is known as a von Karman vortex street that trails behind the body. The von Karman vortex street occurs when the leading edge is perpendicular to the winds, or called vortex shedding. In accordance with one embodiment, the leading edge is preferably 33 degrees off of perpendicular, or 57 degrees off from the winds, such that the vortices remain attached to the leading edge. As each vortex forms, it can be traced along its path aft and into the air stream, such that the centers of these vortices are occupied by very low static air pressure zones. It should also be pointed out that the areas between the vortices, in zones of about equal dimensions, form a high static air pressure zone. It can be appreciated that the frequency of vortex formation is governed by the dimensionless Strouhal number or equation:

$$Sr=fd/V$$

Where: f is the frequency of vortex shedding, d is the characteristic length (for example, hydraulic diameter) and V is the speed of the fluid.

Vortices are typically shed when the value of Sr is approximately 0.2. Also, the vortex street itself is nearly sinusoidal for small Reynolds numbers. For example, for Reynolds numbers between 100-10,000,000, the frequency of the vortex formation is inversely related to the diameter of the body and directly related to the flow velocity (the Strouhal number is about constant across this range, or about 0.18 for a cylinder). The flow velocity profile, the shape of the bluff and the cross section area of the bluff can also affect the Strouhal number.

For example, a leading edge member 30 that is five feet wide by thirty feet tall into a 30 mph wind, one would expect a vortex formation cycle, one clockwise and one counterclockwise, about every one and a half times a second. Thus, two high and two low pressure zones, or one cycle, will flow by a given area directly behind the leading edge each 0.67 seconds. Or to express it another way, we would expect to see a high to low transition each 0.33 seconds, or a sharp pressure transition of some kind, every 0.17 seconds, or almost 6 times a second.

Figure 22:
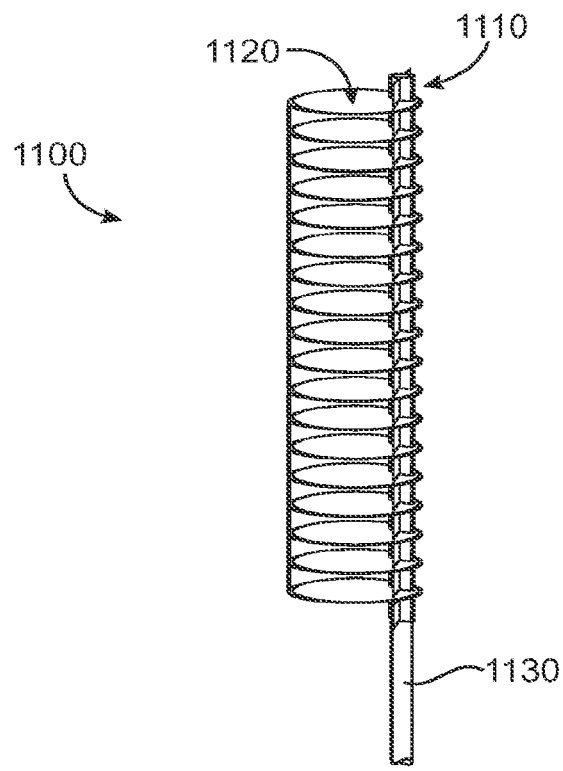
FIG. 22 is a perspective view of a system for converting airflow into mechanical or electrical energy, which utilizes vortices and a pneumatic linkage.
Figure 23:
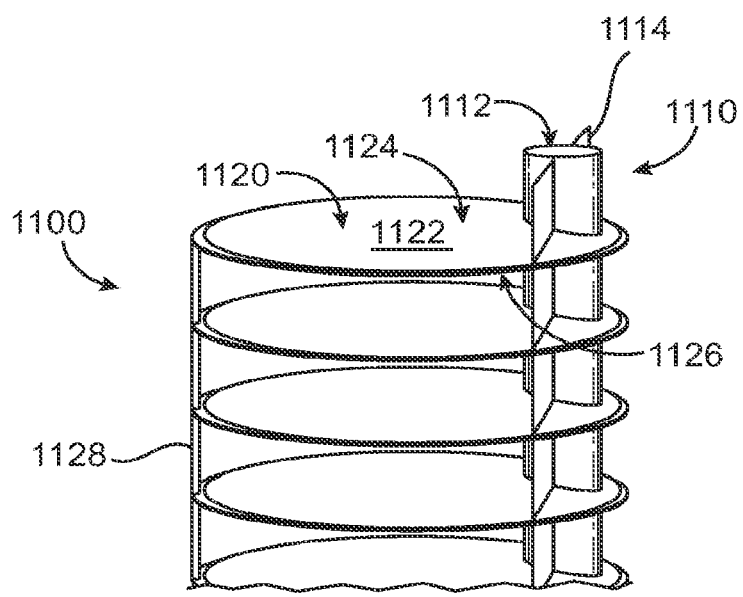
FIG. 23 is a perspective view of a portion of the system of FIG. 22.
Figure 24:
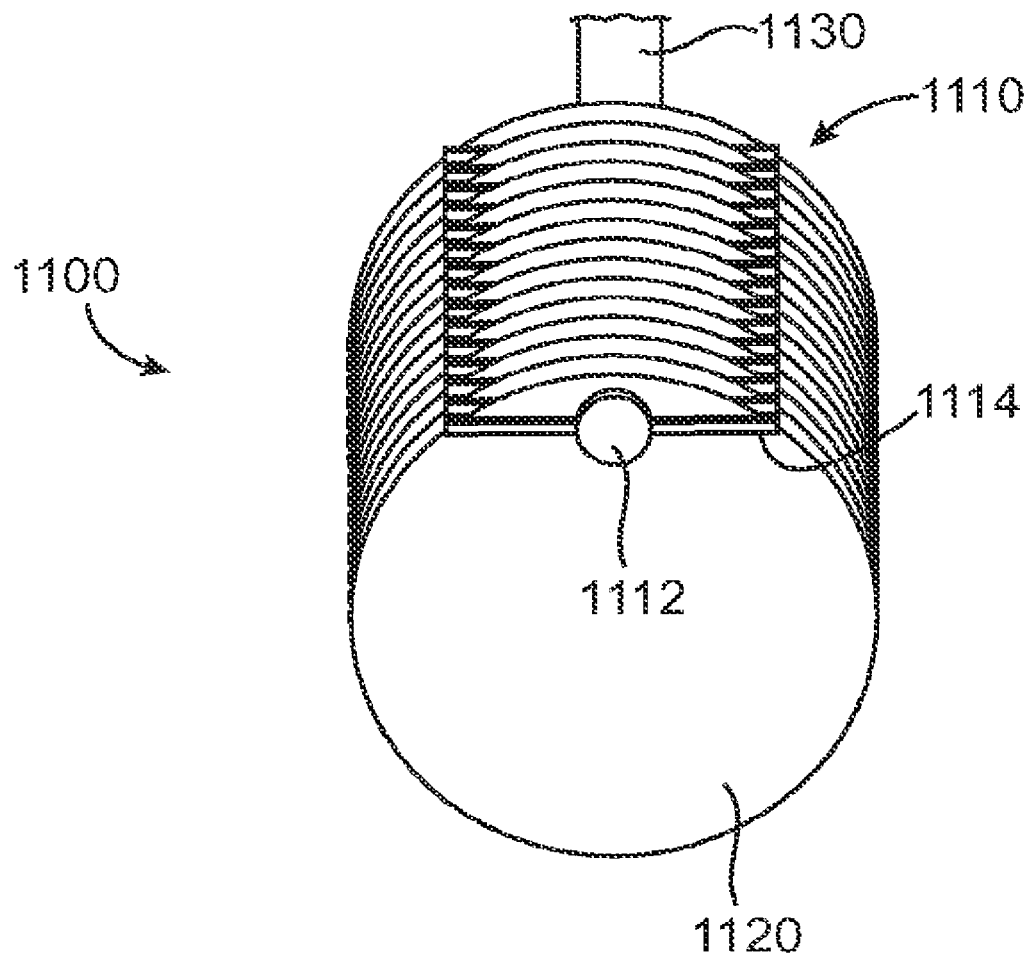
FIG. 24 is another perspective view of the system of FIG. 22.

FIG. 22 illustrates an alternative embodiment of a system 1100 (i.e., "Sail") for converting airflow into mechanical or electrical energy, which utilizes vortices and a pneumatic linkage. The system 1100 includes a plurality of disks or disk-like structures 1120, which are equipped with an expandable membrane or movable surface 1122. As shown in FIGS. 22-24, the disks or disk-like structures 1120 are preferably sealed and include an expandable membranes 1122. In accordance with one embodiment the system is preferably configured to be perpendicular to the winds. That means that the leading edge vortices created by the leading edge will shed and fall back into the vortex street trailing the sail. The disks 1120 will consequently experience rapidly varying pressure gradients as the vortices form and shed, which causes the sealed air volumes within the disks 1120 to alternately expand and contract the membranes 1122. The linkage to these flexing membranes for the conversion process may be pneumatic, mechanical, or even piezoelectric, such the conversion process is not herein restricted. It can be appreciated that capturing energy is possible not just by creating disparate pressure zones spatially separated, but also by zones which are temporarily displaced.

As shown in FIG. 22, the system 1100 (i.e., Sail) includes a predominantly flat plate leading edge member 1110, which is preferably positioned perpendicular to the wind, and a plurality or series of stacked disk-like structures 1120. It can be appreciated that the system 1100 or "Sail" is configured to steer itself into the wind since the aerodynamic center of pressure is located aft of or behind a pivot point of the leading edge member 1110. As the vortices begin to separate, the vortices are located in the area immediately aft of or behind the leading edge member 1110. As the vortices begin to separate, they encounter a series of stacked, disks, or disk-like structures 1120 that respond to static air pressure changes.

The system 1100 is preferably attached to a fixed structure 1130, e.g. a support pipe or tube, which allows the system 1100 to rotate as needed so that the predominantly flat plate leading edge member 1110 is preferably positioned perpendicular to the wind.

FIG. 23 illustrates the system 1100 and the disks or disk-like structures 1120. The disks or disk-like structures 1120 are equipped with an expandable membrane or movable surface 1122. The expandable membrane or movable surface 1122 includes an upper or top surface 1124 and a lower or bottom surface 1126. The disks 1120 are connected to one another via the leading edge member 1110, which includes a connecting rod 1112 with a predominantly flat plate 1114, and an outer support 1128.

As a low pressure zone associated with a vortex center, for example, moves into place, the disks 1120 expand (the internal static air pressure is greater than that outside the membranes). Then, as the low pressure zone moves out and is replaced by an interstitial high pressure zone, the disks 1120 contract (the internal static air pressure is less than the external pressure). It can be appreciated that this cycle can be repeated several times a second.

Inside the disk 1120, an electromagnetic generator or generator (not shown) is placed to convert the mechanical energy to electrical or another form of mechanical energy. It can be appreciated that the generator can be a piezoelectric, hydraulic pistons, or other suitable device for converting the expansion and contraction of the disks 1120 into energy. For example, permanent magnets and electrical coils taken from off-the-shelf speakers can be used, which is the very same method used to power audio speakers, but is operated in reverse instead.

As shown in FIG. 23, for each disk 1120, each membrane 1122, the upper or top surface 1124, for example, would be attached to the magnet with the coil attached to the lower or bottom surface 1126. As the membranes 1122 expand and contract, the membranes move the magnet up and down in relation to the surrounding coil. The magnet lines of force would cross the wire sections continually, and thereby create an oscillating, or AC current. In this application, the AC current can be rectified through a full-wave bridge rectifier and then fed into a battery system (not shown)

FIG. 24 illustrates another perspective view of the system 1100 of FIG. 22. As shown in FIG. 24, the system 1100 includes a plurality of disks or disk-like structures 1120 attached to the leading edge 1110. It can be appreciated that the disks 1120 offer very little resistance to the vortices, since the local air velocities are horizontal and do not interact with the structure to block their progression or prevent their formation. The internal disk linkages, including the membranes, are designed to resonate at the expected, sub-sonic frequency ranges.

In addition, it can be appreciated that the system 1100 has no visible moving parts, such that the system 1100 can be almost entirely silent in operation. Although a mechanical to electrical conversion process is shown here, it is not meant to be limited by this. It can be appreciated that the support pipe or tube, 1130, can conduct pneumatic variations for conversion a at the base of the structure in the same way that we can have several drawtubes supporting one conversion process. For example, a hydraulic piston can be compressed by the membranes thus transmitting a pressurized fluid to the base of the tower. Alternatively, the electromechanical system can be replaced by piezoelectric crystals, or a central and connecting rod could collect and transfer the force of many disks. The system 1100 can also be supported by a cylindrical leading edge located in the center of the stack. In this case, the entire system 1100 would be immobile yet capable of capturing and converting winds from any direction.

It can be appreciated that the system 1100 as shown in FIGS. 22-24 can further include a means for positioning the leading edge into the airflow, wherein the leading edge member is facing substantially into the airflow. For example, a support structure 1130 as shown in FIGS. 22 and 24, such that the support structure 1130 orients the system 1100 so that the leading edge member 1110 is facing into the airflow. In addition, the system 1100 can also include an airflow direction sensor and a motor for rotating the drawtube in response to the airflow direction sensor.

Alternatively, a conduit between two widely varying states can be built and the energy extracted from the two states. In one preferred embodiment, a conversion process would be included within the conduit. However, if a single state were made to oscillate between widely varying states, the conduit and energy conversion process could be collocated, such that two disparate states are created, which is comprised of a high pressure area and a low pressure area. In addition, it can be appreciated that these states may be displaced spatially or temporally. For example, if the states are displaced spatially, the two states can be connected with a spatial conduit, which can include a conversion process to convert the airflow into energy. Alternatively, if the displacement is in time or temporally, then the conduit is typically not spatial, but is reactive to time based variations.

Inline Duct

Figure 25:
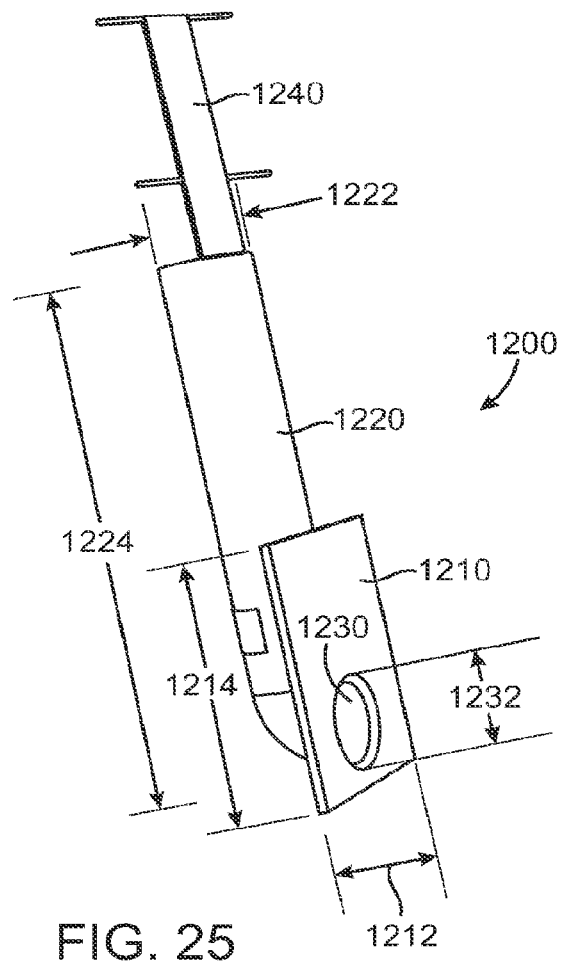
FIG. 25 is a perspective view of another embodiment of a system for converting airflow into mechanical or electrical energy, which utilizes an array of drawtubes that are boosted with high-pressure air from an inline duct.

FIG. 25 is a perspective view of another embodiment of a system 1200 for converting airflow into mechanical or electrical energy, which utilizes an array of drawtubes 1220 that are boosted with high-pressure air from an inline duct or passageway 1230. As shown in FIG. 25, the system 1200 includes a drawtube 1220 having an embedded prop or generator (not shown) as an energy conversion device, which is boosted with high pressure air from an inline duct 1230.

Figure 26:
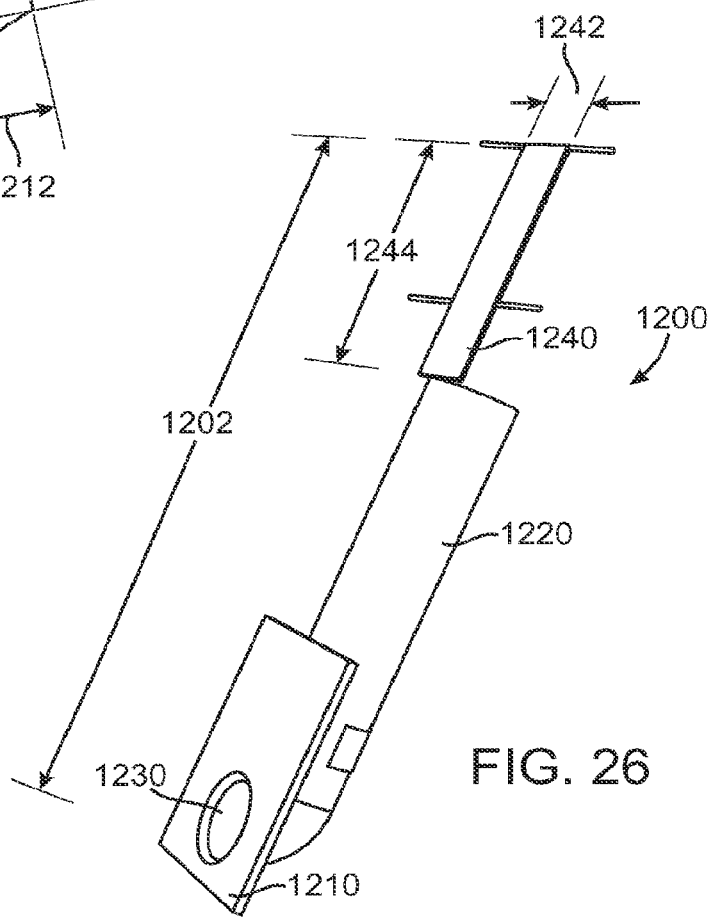
FIG. 26 is another perspective view of the system for converting airflow into mechanical or electrical energy using a drawtube having an inline duct and a bluff body as shown in FIG. 25.
Figure 27:
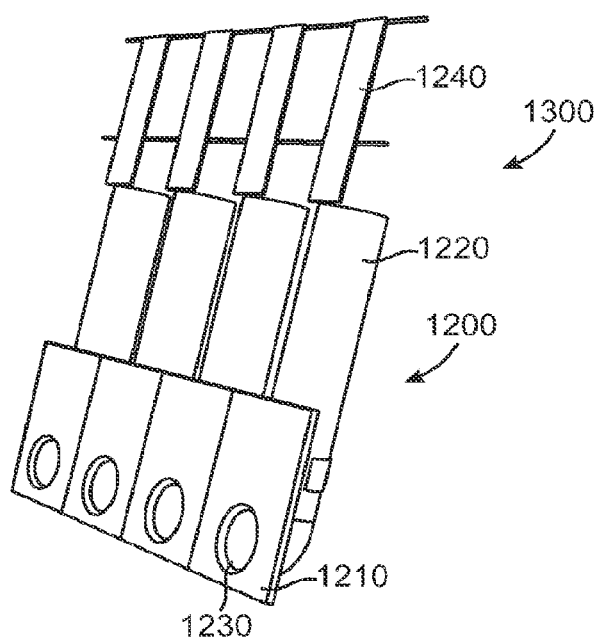
FIG. 27 is a perspective view of an array of drawtubes having an inline duct and a bluff body as shown in FIG. 26.

In accordance with one embodiment, the drawtube 1220 is preferably about 2 ft. in diameter 1222 having an embedded prop/generator as the energy conversion device. The system 1200 also includes a base plate 1210, which can either be attached to the drawtube 1220, or the base plate 1210 can be suspended in its own array as shown in FIGS. 26 and 27. In accordance with another embodiment, the leading edge 1222 can be suspended in its own array. It can be appreciated that the light weight plates can be constructed of any suitable material, metallic sheet or even stretched fabric for example, suspended by taut cables. The duct or passageway 1230 has an opening with a diameter 1232, which is preferably approximately equal to, and/or slight larger or smaller than the diameter of the drawtube, and which is mounted into a base plate 1210 that is equal in width 1212 to a desired or optimal spacing for an array of drawtubes 1220. For example, in accordance with one embodiment, wherein the drawtube has a 2 foot diameter 1222, the base plate 1210 preferably has a width 1212 that is 1.5 to 4 times the diameter of the drawtube 1220, and more preferably a width 1212 of about 2.25 times the diameter of the drawtube 1220 (i.e., 4.5 feet across (2+2 (1.25))), and a height 1214 of about 2 to 6 times the diameter of the drawtube 1220, and more preferably about 3 times the diameter 1222 of the drawtube 1220 (i.e., about 6 feet). It can be appreciated that the height 1214 of the base plate 1210 can be more or less than 2 to 6 times the diameter 1222 of the drawtube 1220.

FIG. 26 is a perspective view of a further embodiment of a system 1200 for converting airflow into mechanical or electrical energy using a drawtube 1220 having an inline duct 1230 and a bluff body 1240. It can be appreciated that the bluff body 1240 can have a slight curvature or other suitable shape, which presents an obstacle to the wind. As shown in FIG. 26, the bluff body 1240 presents an obstacle to the wind, such that the airflow is forced to accelerate around the obstacle. In accordance with one embodiment, the bluff body 1240 is a substantially planar or predominantly flat plate having an aspect ratio, or width 1242 to height 1244, of approximately 3:1.

FIG. 27 is a perspective view of an array 1300 of drawtubes 1220 having an inline duct 1230 and a bluff body 1240 as shown in FIG. 26. As shown in FIG. 27, a plurality of drawtubes 1220, each having an inline duct 1230 and a bluff body 1240 can be arranged or assembled in a side-by-side configuration to form an array 1300 of drawtubes 1220.

Figure 28:
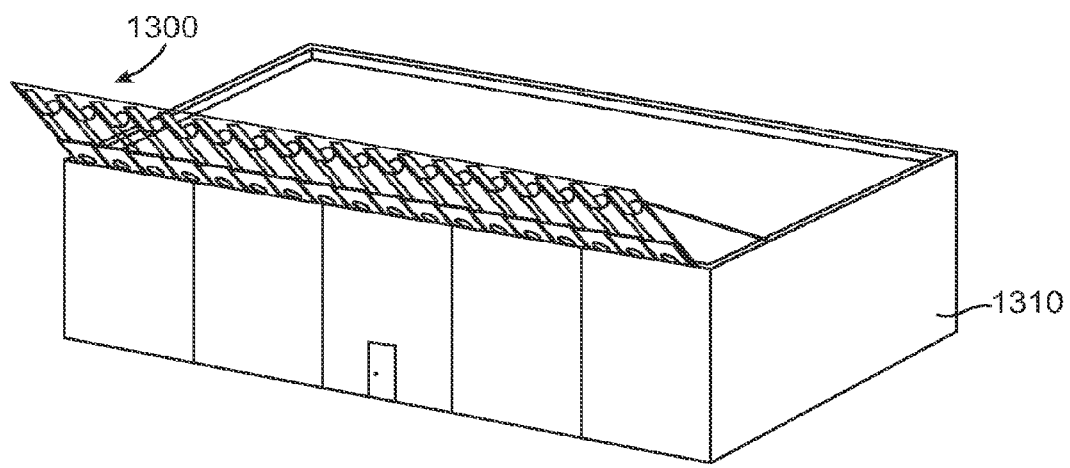
FIG. 28 is a perspective view of an array of drawtubes having an inline duct and a bluff body as shown in FIG. 26, which are attached to a building.

FIG. 28 is a perspective view of an array of drawtubes having an inline duct and a bluff body as shown in FIG. 26, which are attached to a building 1310. As shown in FIG. 28, the individual units are designed to fit into an array 1300 positioned on a building 1310. It can be appreciated that each drawtube in the array 1300 can produce a minimum of 250 watts in a 28 mph wind in the special case of a 2 foot diameter drawtubes. In addition, it can be appreciated the system and design as shown in FIGS. 25-28 can take advantage of the pressure differentials surrounding a building in the wind, exactly in the same way as the Eave turbine.

In accordance with one embodiment, the system 1300 can be positioned so as to face directly into the prevailing winds. Alternatively, the angle of inclination chosen here is 45 degrees forward, which should approximate the optimal angle of 33 degrees off the perpendicular to the airflow. It can be appreciated that the sizing and the angles are variable and subject to architectural restraints.

Vehicular Exhaust Sails

In accordance with another embodiment, it can be appreciated that a drawtube 10, 100, 200, 300 as shown in FIGS. 1-4 can be attached to the exhaust pipe of an internal combustion engine (not shown) to improve the overall operating efficiency of the engine. It can be appreciated that the internal combustion is typically directly affected by the input air pressure as well as the output pressure. For example, turbo chargers increase the pressure of the intake air, which improves the power and performance of the engine. Although, there have also been some exhaust turbines, which reduce the exhaust pressure, these have been very expensive. However, lowering the pressure on the exhaust side has the same effect as increasing the intake pressure, which increases the engines performance.

Figure 30:
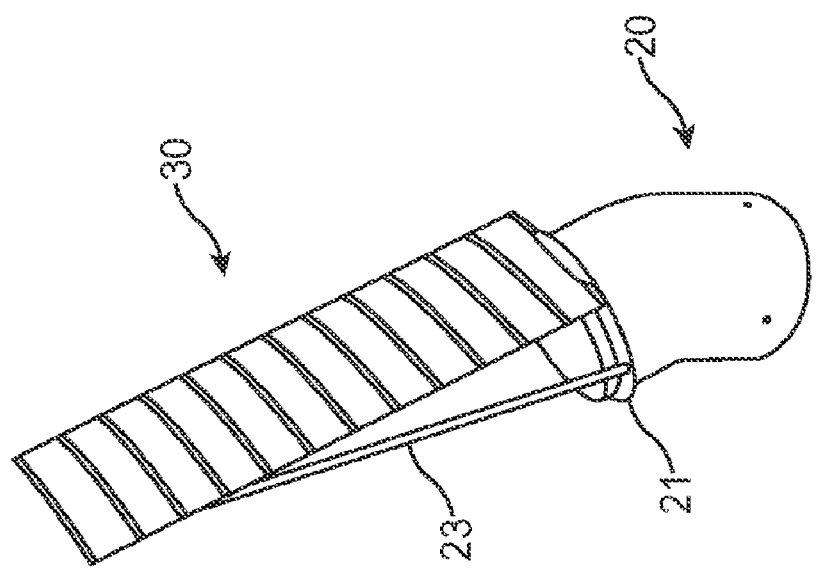
FIG. 30 is another perspective view of a vehicular exhaust sail.
Figure 29:
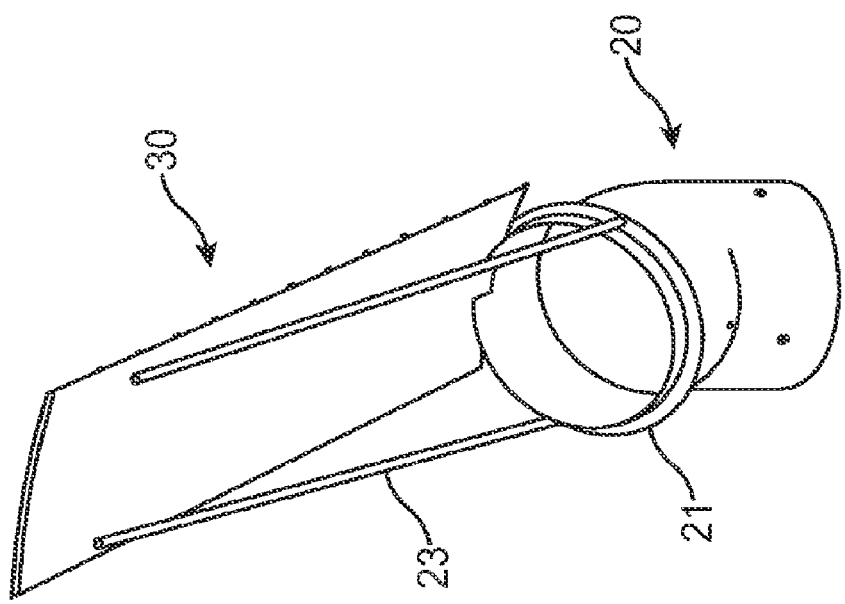
FIG. 29 is a perspective view of a vehicular exhaust sail.

FIGS. 29 and 30 are perspective views of a vehicular exhaust sail in accordance with one embodiment. As shown in FIG. 29, the addition of a drawtube 10, 100, 200, 300 comprised of a tubular member 20 (i.e., exhaust pipe) and a substantially planar leading edge member 30. It can be appreciated that the drawtube 10, 100, 200, 300 is a simple device, robust and easy to manufacture. It has no moving parts and can be installed quickly onto the vertical exhaust stacks of the average diesel tractor trailer. Furthermore, access is not required to the engine compartment. In addition, typically, the best efficacy would be seen on long distant runs for trucks or tractors, wherein the trucks or tractors would be in the open air and running at highway speeds.

As shown in FIGS. 29 and 30, the substantially planar leading edge member 30 is slightly curved to increase its strength. The leading edge 30 also cants backward at 33 degrees off from perpendicular to the wind. In accordance with one embodiment, the optimal width of the leading edge 30 would be about 13/16 of the diameter of the exhaust stack (i.e., tubular member 20). A sleeve 21, as shown, can be designed to fit tightly over the exhaust stack pipes with a pair of support members 23. A set screws or other suitable device (not shown) is preferably used to secure the leading edge member 30 to the exhaust pipe or stack (i.e., tubular member 20).

An aspect ratio of 6:1, or better, can be attained through the combined airfoil, exhaust stack pipe and exhaust sail, as seen by the wind. Local accelerations of the airflow due to the cab of the truck or trailer would enhance the performance, just as the Eave turbine performance is improved by the building itself. It can be appreciated that a drawtube 10, 100, 200, 300 can be applied to other vehicles as well as interstate trucks or light aircraft.

Trip Fence

As shown in the embodiment depicted in FIGS. 1-4, a drawtube 10 may be comprised of a tubular member 20 having a first opening 22 and a second opening 24. The first and second openings 22, 24 may be formed in two planes substantially perpendicular to a longitudinal axis of the tubular member 20. A leading edge member 30 may be positioned on a windward side of the first opening 22. An energy conversion system may include an energy conversion device 70 configured to convert an airflow through the tubular member 20 into mechanical or electrical energy. It can be appreciated that the drawtube 10 may function as a suction device, and/or the drawtube 10 can be used to pressurize a plenum.

Figure 31:
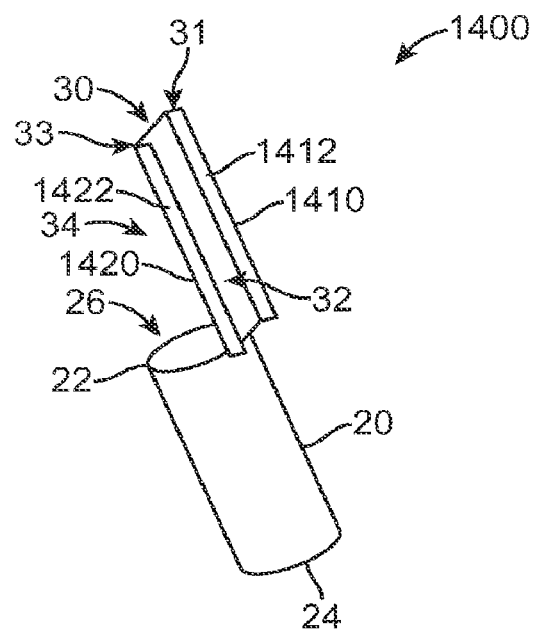
FIG. 31 is a perspective view of a system for converting an airflow into mechanical energy in the form of a drawtube with a trip fence according to an embodiment of the invention.

In accordance with an exemplary embodiment shown in FIGS. 31-34, a system 1400 for converting an airflow into mechanical or electrical energy may include a drawtube having a tubular member 20, at least one leading edge member 30 and a pair of short fences 1410, 1420 along each vertical edge 31, 33 of the leading edge member 30. As shown in FIG. 31, added along each vertical edge 31, 33 of the leading edge member 30 is a short fence (i.e., trip fence) 1410, 1420 in the form of a raised edge 1412, 1422. In accordance with an exemplary embodiment, the short fence or trip fence 1410, 1420 may be disposed on the windward side of the leading edge member 30. However, it can be appreciated that a short fence (or trip fence) 1410, 1420 in the form of a raised edge 1414, 1424 can be included on both the windward and leeward sides of the leading edge member 30 (see FIG. 32). In accordance with an exemplary embodiment, the height of the fence 1410, 1420 measured from a surface 32, 34 of the leading edge member, may be, for example, about 0.15 to 0.25 times the width of the leading edge member 30, and preferentially about 0.1875 times the width of the leading edge member 30.

In accordance with an exemplary embodiment, the fence 1410, 1420 may be perpendicular to the surface 32, 34 of the leading edge 30. In accordance with an alternative embodiment, the fence 1410, 1420 can be slightly off perpendicular. The fence 1410, 1420 may be solid (to the airflow) and may be as thin as possible. The fence 1410, 1420 may also have a sharp edge. It can be appreciated that in accordance with an embodiment, the greatest increase in performance of the system 1400 may occur when the trip fence (or raised edge) 1410, 1420 is along the actual vertical edge 31, 33, rather than at some point less that the full width of the leading edge member 30.

If the leading edge member 30 is not flat, the trip fence 1410, 1420 can be incorporated into the leading edge member 30 through a complex curve creating a seamless transition. For example, if the leading edge member 30 is curved (i.e., not substantially flat), the curvature of the leading edge member 30 can be slight and in either direction, i.e., toward the wind (or airflow) or away from the wind (airflow).

The addition of windward trip fences 1410, 1420 to the longitudinal edges 31, 33 of a leading edge member 30 of a drawtube can improve overall performance of the drawtube. For example, when a set of trip fences 1410, 1420 is included on the windward side of the leading edge member 30 of a simple drawtube, and the drawtube is either perpendicular to the wind or inclined away, for example, at up to 33 degrees off of perpendicular, performance (i.e., power output) of the drawtube may be at least about 10% better than a drawtube without trip fences. The trip fences 1410, 1420 may provide the greatest benefit when at least a portion is positioned at the root of the leading edge member 30, (i.e., that portion nearest the drawtube opening 22). As the trip fences 1410, 1420 approach the opposite end (i.e., the end away from the first opening 22) of the leading edge member 20, typically less and less benefit is seen.

The power output from a drawtube with trip fences is generally greater than a similarly sized and oriented drawtube without trip fences, even in off axis winds over a limited range of angles. The power curves of drawtubes with and without trip fences positioned in winds of varying angles are instructive. In one example, a simple drawtube without trip fences may be oriented perpendicular or substantially perpendicular to an axial direction of airflow. The drawtube may produce a first power output in axial winds. The power produced by the drawtube may increase up to at least about 15% as the winds reach 30 degrees off axis. As the angle of the winds approaching the drawtube increases from 30-45 degrees off axis, the power produced may decline until reaching the same full power level at 45 degrees off axis as that which is produced with head-on (axial) winds. As the angle of the winds approaching the drawtube exceeds 45 degrees off axis, the power may decrease below power levels produced in head-on winds.

In comparison, when a trip fence 1410, 1420 is installed on the windward side of the leading edge member 30 of a simple drawtube oriented perpendicular or substantially perpendicular to an axial direction of airflow, the power produced by the drawtube may increase as the angle of the winds relative to the axial direction increases from 0 degrees up to about 30 degrees. When the angle of the winds approaching the drawtube exceeds about 30 degrees, power levels will start to drop off. It can be appreciated that the power produced by a simple drawtube with a trip fence 1410, 1420 will be greater than one without when winds are approaching the drawtube between at least zero and about 30 degrees off axis. Accordingly, it can be appreciated that the trip fences 1410, 1420 can provide improved or increased performance for drawtubes where off axis winds are limited to about 30 degrees or less.

In another embodiment, the simple drawtube may be inclined at, for example, 33 degrees away from perpendicular to the axial direction of the wind. The power curves for inclined drawtubes with and without trip fences are similar to those produced when the same drawtubes are oriented substantially perpendicular, both in axial and off axis winds. For example, when subjected to winds at 30 degrees off axis, an inclined drawtube may provide approximately 5% to 10% more power than the inclined drawtube in axial winds.

Figure 32:
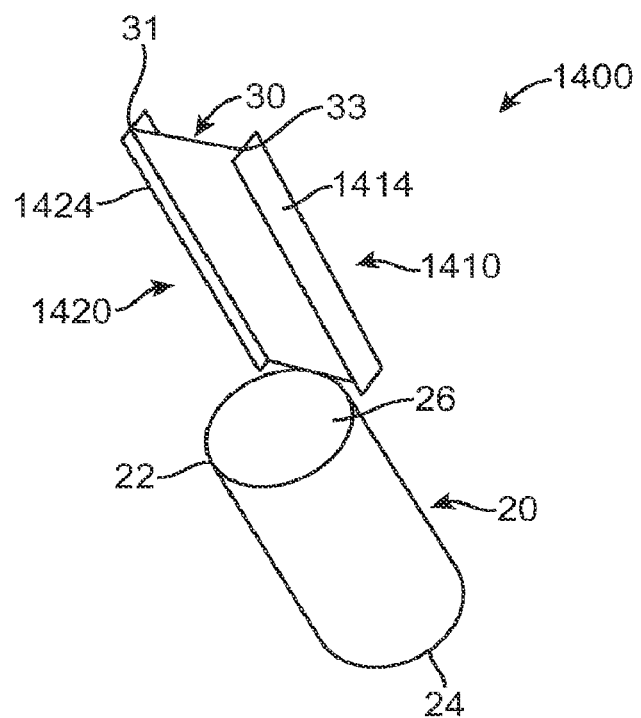
FIG. 32 is another perspective view of the drawtube with a trip fence of FIG. 31.

In accordance with another embodiment, as shown in FIG. 32, the trip fences 1410, 1420 in the form of raised edges 1414, 1424 on a single leading edge member 30 can extend in both directions, i.e., windward and leeward, which may achieve an increase in performance for a simple drawtube. For example, the increase in performance for a simple drawtube can be, for example, an additional 1% or greater. It can be appreciated that when the trip fences 1410, 1420 extend in both directions, the configuration may also have structural benefits. Additionally, trip fences 1430, 1440 may also increase the performance of a complex (compound) drawtube when applied to a scoop or scoop member 40 (see FIGS. 33-34). The installation of the trip fences 1410, 1420 for a complex drawtube may be particularly beneficial, since benefits are realized for both the leading edge member 30 and the scoop (or scoop member) 40 (see FIGS. 33-34).

Figure 33:
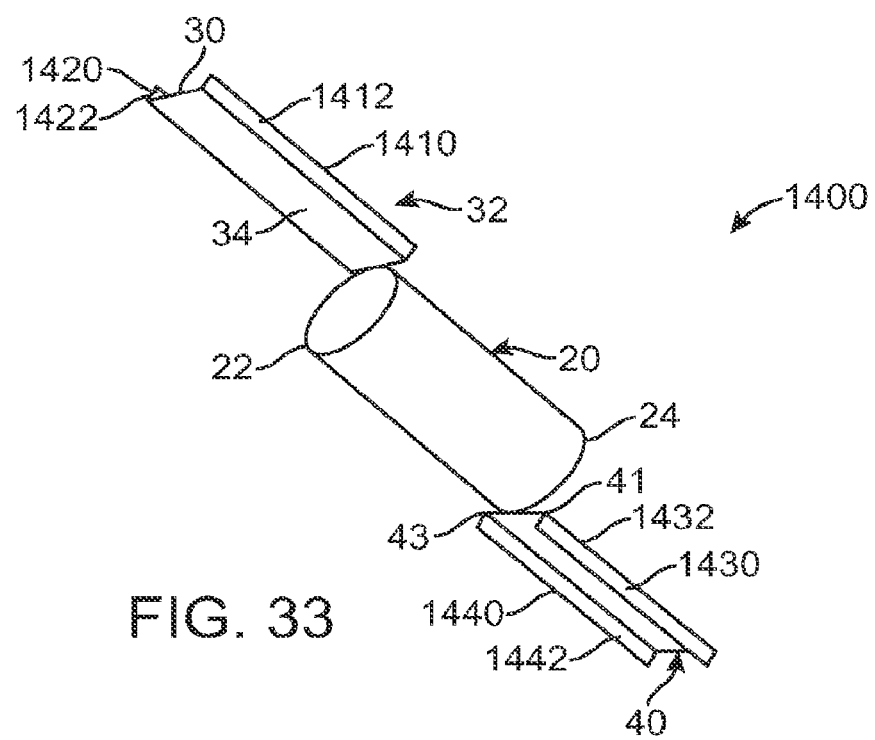
FIG. 33 is a perspective view of another embodiment of the system for converting an airflow into mechanical energy in the form of a compound bidirectional drawtube with a trip fence.
Figure 34:
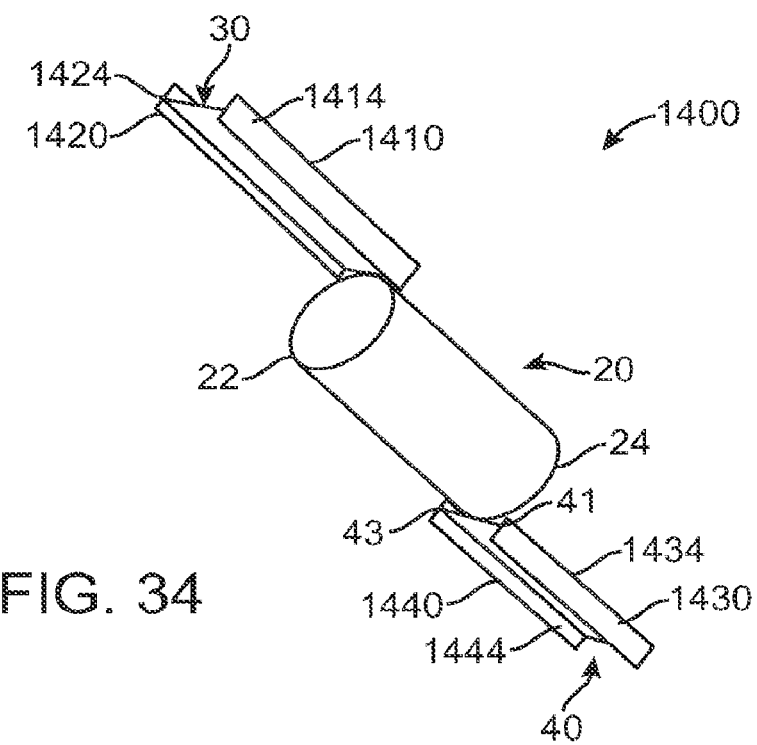
FIG. 34 is another perspective view of the compound bidirectional drawtube with a trip fence of FIG. 33.

In accordance with another exemplary embodiment as shown in FIG. 33, a trip fence 1430, 1440 in the form of a raised edge 1432, 1442 can be added to each vertical edge 41, 43 of a scoop (or scoop member) 40 of a complex (compound) drawtube. It can be appreciated that in accordance with another embodiment as shown in FIG. 34, a short fence (or trip fence) 1430, 1440 in the form of an additional raised edge 1434, 1444 can be included on both the windward and leeward sides of the scoop 40 as well. It can be appreciated that when considering only the scoop member 40, performance of the drawtube is typically unaffected by the addition of a trip fence 1430, 1440 on the leeward side with up to a 0.1875 ratio of height of the trip fence to width of the scoop 40. After that, or with a taller trip fence 1430, 1440, the performance may decrease.

In accordance with an embodiment, a complex drawtube having trip fences 1430, 1440 on the windward side of the scoop or scoop member 40 up to, for example, about 0.125 times the scoop 40 width, may provide increased performance. In accordance with one example, the recorded benefit (i.e., improved performance) of the system was approximately 2.5% overall compared to a complex drawtube without trip fences on the windward side of the scoop member. The complex drawtube with scoop trip fences 1430, 1440 depicted in FIG. 33 may exhibit increased performance substantially similar to the simple drawtube with leading edge trip fences 1410, 1420 when subjected to off axis winds. Accordingly, it can be appreciated that, in general, the most benefit or increase in performance may be seen for those installations that limit off axis winds.

In accordance with an exemplary embodiment, a complex drawtube with trip fences 1410, 1420, 1430, 1440 (see, e.g., FIGS. 33-34), may include "inboard" trip fences 1410, 1420, which may be, for example, about 0.125 times the leading edge width 30, and "outboard" fences 1430, 1440, which may be, for example, about 0.1875 times the width of the scoop or scoop member 40. The fences 1410, 1420 may extend the full length of the leading edge member 30 and may be located on each vertical edge. In addition, the trip fences 1410, 1420 may be solid to the wind with sharp edges.

Figure 35:
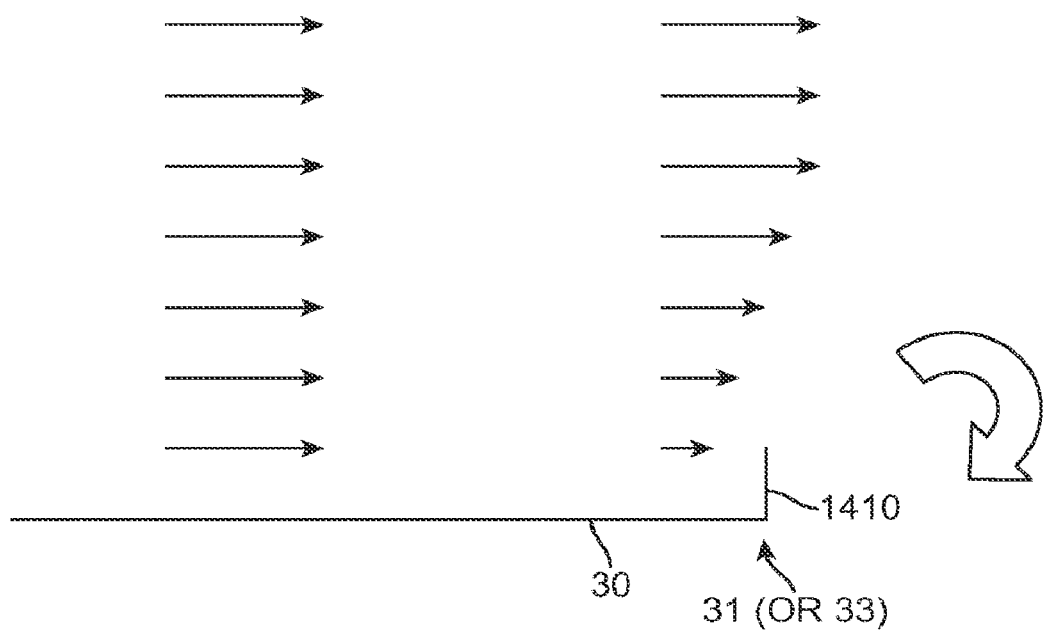
FIG. 35 is a schematic diagram of an airflow spilling off the leading edge and showing the initiation of the vortex formation as the airflow reaches the vertical edge.

In general, the trip fences 1410, 1420 may help create strong vortices as the air spills off the leading edge member 30. For example, air spilling off the leading edge 30 or the scoop 40, may have at least some horizontal component, or vector. As the horizontal component or vector approaches the trip fence 1410, 1420, 1430, 1440, the airflow slows down. As shown in FIG. 35, the overall impact to the velocity front would be to initiate vortex formation as the airflow reaches the vertical edge 31, 33. The strong vortices create deep low pressure centers due to the momentum of the rotating air mass. Accordingly, it may be desirable to create bending flow lines (not shown) to create pressure differences in the open air. Similar structures, for example, are used as spoilers on vehicles.

While the invention has been described in detail with reference to the preferred embodiments thereof, it will be apparent to one skilled in the art that various changes and modifications can be made and equivalents employed, without departing from the present invention.

The invention claimed is:

1. A system for converting an airflow into mechanical or electrical energy comprising:
    a tubular member, the tubular member having a first opening and a second opening;
    a leading edge member positioned adjacent to one of the first and second openings; and
    a raised edge along each longitudinal edge of the leading edge member.

2. The system of claim 1, wherein the leading edge member is positioned on a windward side of the first opening.

3. The system of claim 2, wherein the raised edges are on the windward side of the leading edge member.

4. The system of claim 1, wherein a leeward side of the leading edge member has a raised edge along each longitudinal edge.

5. The system of claim 1, wherein the raised edge has a height of about 0.15 to 0.25 times a width of the leading edge member.

6. The system of claim 1, wherein the raised edge has a height of about 0.1875 times a width of the leading edge member.

7. The system of claim 1, wherein the raised edge is substantially perpendicular to a surface of the leading edge member.

8. The system of claim 1, wherein the raised edge is solid.

9. The system of claim 1, wherein the raised edge has a sharp edge.

10. The system of claim 1, wherein the raised edge is disposed along an outermost longitudinal edge.

11. The system of claim 1, wherein the leading edge member is not substantially flat, and the raised edges are incorporated into the leading edge member.

12. The system of claim 1, wherein the leading edge member has a curved surface.

13. The system of claim 1, wherein the raised edge is disposed on a portion of the leading edge member nearest the drawtube opening.

14. The system of claim 1, wherein the first and second openings are formed in two planes substantially perpendicular to a longitudinal axis of the tubular member.

15. The system of claim 1, wherein the leading edge member has a width which is about equal to or less than a diameter of the tubular member.

16. The system of claim 1, further comprising an energy conversion device configured to convert an airflow through the tubular member into mechanical or electrical energy.

17. A method for collecting wind energy comprising:
providing a drawtube including:
    a tubular member having a pair of openings; and
    a leading edge member positioned adjacent to one of the openings and having a raised edge along each longitudinal edge of the leading edge member;
positioning the drawtube in the wind with the leading edge member facing into the wind; and
passing wind around the leading edge member to create eddies in and around the tubular member and the leading edge member.

18. The method of claim 17, further comprising creating an airflow within the tubular member; and
converting the airflow to mechanical or electrical energy.

19. The method of claim 17, further comprising positioning a scoop member on an opposite side of the tubular member adjacent to the other of the openings.

20. The method of claim 19, wherein the scoop member has a raised edge along each longitudinal edge of the scoop member.

* * * * *